United States Patent
Parry-Barwick et al.

(10) Patent No.: US 12,118,377 B2
(45) Date of Patent: Oct. 15, 2024

(54) TRANSITION TO MODERN MANAGEMENT USING MANAGED VIRTUAL MACHINES

(71) Applicant: VMware, Inc., Palo Alto, CA (US)

(72) Inventors: Stephen Jonathan Parry-Barwick, Sydney (AU); Maxwell Christopher Fox, Sydney (AU); Paul Adam Ryman, Sydney (AU); Yingfeng Ou, Beijing (CN)

(73) Assignee: Omnissa, LLC, Palo Alto, CA (US)

( * ) Notice: Subject to any disclaimer, the term of this patent is extended or adjusted under 35 U.S.C. 154(b) by 530 days.

(21) Appl. No.: 17/245,243

(22) Filed: Apr. 30, 2021

(65) Prior Publication Data
US 2022/0350631 A1 Nov. 3, 2022

(51) Int. Cl.
G06F 9/455 (2018.01)

(52) U.S. Cl.
CPC ...... *G06F 9/45558* (2013.01); *G06F 9/45545* (2013.01); *G06F 2009/45562* (2013.01); *G06F 2009/4557* (2013.01); *G06F 2009/45587* (2013.01)

(58) Field of Classification Search
CPC ............ G06F 9/45558; G06F 9/45545; G06F 2009/45562; G06F 2009/4557; G06F 2009/45587
See application file for complete search history.

(56) References Cited

U.S. PATENT DOCUMENTS

| | | | |
|---|---|---|---|
| 2018/0159856 A1* | 6/2018 | Gujarathi | H04L 63/0281 |
| 2019/0245848 A1* | 8/2019 | Divoux | H04L 63/0815 |

* cited by examiner

*Primary Examiner* — Esther B. Henderson
(74) *Attorney, Agent, or Firm* — Kim & Stewart LLP

(57) ABSTRACT

Examples of enterprise management using managed virtual machines are described. A host user context configuration can be received from a host management agent. The host user context configuration can include one or more policies. A managed virtual machine user context configuration can be received from a guest management agent within a managed virtual machine. A portion of the host user context configuration can be processed using a translation matrix to identify a configuration service provider (CSP)-based profile that is mapped to a policy from the host user context configuration. A command to enforce the CSP-based profile on the managed virtual machine can be transmitted.

20 Claims, 10 Drawing Sheets

TRANSITION TO MODERN MANAGEMENT USING MANAGED VIRTUAL MACHINES

BACKGROUND

Personal devices are being used for access to enterprise computing systems and resources with greater frequency. The use of these personal devices can be associated with productivity gains and cost savings. The concept "bring your own device" (BYOD) for access to enterprise computing systems may have met initial resistance due to security concerns, but more and more companies are now looking to incorporate BYOD policies.

With the growing number of BYOD devices, various challenges can arise in management scenarios. For example, the enterprise may use a management service to protect access to enterprise data and enterprise-related functionalities. However, a device may or may not be managed or subject to restrictions, policies, and other management configurations promulgated by the enterprise management. Access to the capabilities of a device can be managed through the administration of the suite of applications based on a set of management policies, compliance rules, and other configuration data which is defined and enforced by the management service. Since a user of a BYOD device can take the device on vacation or other locations without network access, the device may be used for an extended period of time without contacting the management service. This provides further complications to the management process. There is a need for better management solutions for BYOD devices and other devices that are used at home, as well as those that can be freely taken from location to location.

BRIEF DESCRIPTION OF THE DRAWINGS

Many aspects of the present disclosure can be better understood with reference to the following drawings. The components in the drawings are not necessarily drawn to scale, with emphasis instead being placed upon clearly illustrating the principles of the disclosure. In the drawings, like reference numerals designate corresponding parts throughout the several views.

DETAILED DESCRIPTION

The present disclosure relates to enterprise management using managed virtual machines (VMs). As outlined above, personal devices are being used to access enterprise applications, data, and other resources with greater frequency. The use of these personal devices can be associated with productivity gains and cost savings. The concept "bring your own device" (BYOD) for access to enterprise resources faces a number of issues, including the provision for offline access. Whether a device is provided by the enterprise or the end user, devices are more often operated from home and other locations that are remote from an enterprise local area network. The present disclosure provides a more effective solution that can provide both greater flexibility and efficacy for these devices, as well as increase storage efficiency for dual-managed (i.e., host- and guest-managed) devices.

Figure 1:
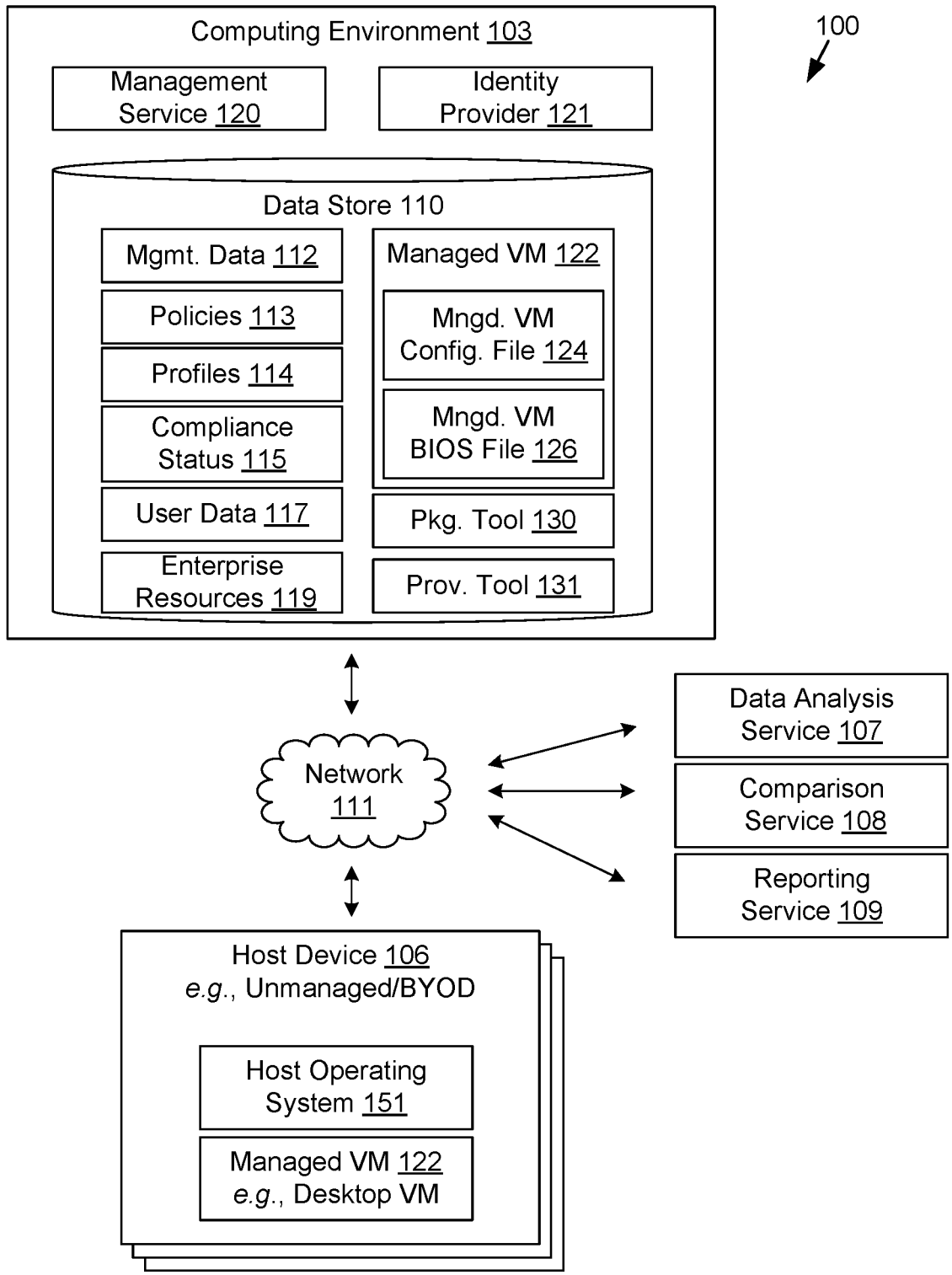
FIG. 1 illustrates an example networked environment for distributing and managing managed virtual machines, according to various examples described herein.

FIG. 1 illustrates an example networked environment 100 for enterprise management using managed VMs 122 according to various examples described herein. The networked environment 100 includes a computing environment 103, several host devices 106, a data analysis service 107, a comparison service 108, and a reporting service 109, in communication through a network 111.

The computing environment 103 can be embodied as one or more computers, computing devices, or computing systems. In certain embodiments, the computing environment 103 can include one or more computing devices arranged, for example, in one or more servers or computer banks. The computing device or devices can be located at a single installation site or distributed among different geographical locations. The computing environment 103 can include a plurality of computing devices that together embody a hosted computing resource, a grid computing resource, or other distributed computing arrangement. In some cases, the computing environment 103 can be embodied as an elastic computing resource where an allotted capacity of processing, network, storage, or other computing-related resources vary over time. As further described below, the computing environment 103 can also be embodied, in part, as certain functional or logical (e.g., computer-readable instruction) elements or modules as described herein.

The computing environment 103 can operate as an environment for mobile device management or a unified endpoint management (UEM) platform that can manage the host devices 106. In that context, the computing environment 103 includes a data store 110. The computing environment 103 can also execute a management service 120 and an identity provider 121. The data store 110 includes areas in memory for the storage of management data 112, policies 113, profiles 114, compliance status 115, user data 117, enterprise resources 119, and a managed VM 122, among other types of data. Enterprise resources 119 can include enterprise data, enterprise-provided applications, and other resources.

The management service 120 can operate as a UEM platform that can manage both the managed VMs 122, as well as the host devices 106, that are enrolled with the management service 120 for management. However, the management service 120 can manage the managed VMs 122 even if the host device 106 is unmanaged. An unmanaged host device 106 can include host devices 106 that are not enrolled with the management service 120, and lack management-service-enforced policies, restrictions, profiles, or other management-service-enforced configurations for the host device 106 or the host operating system 151. The management service 120 can be accessible over a public wide area network (WAN) such as the Internet.

Management data 112 can represent information about managed VMs 122 and host devices 106 that are enrolled as managed devices with the management service 120, as well as information about unmanaged host devices 106 on which enrolled managed VMs 122 are executed as guests.

The management data 112 can include a unique VM identifier for the managed VM 122, a device identifier of the host device 106 on which it is executed, certificates associated with the host device 106, a user identifier identifying the user account with which the host device 106 or managed VM 122 is linked, authentication tokens provided by the identity provider 121, configuration profiles 114 and policies 113 assigned to the host device 106 and/or the managed VM 122, and other information regarding management. The management data 112 can also include host specific information such as a virtual trusted platform module (vTPM) device created on the host device 106 for encryption.

The management data 112 can also include a compliance status 115 associated with the managed host device 106 and/or the managed VM 122. The compliance status 115 can identify which rules are violated by the host device 106, as well as any that are violated by the managed VM 122. For example, the host device 106 may have been taken outside of a specified geofence defined for the host device 106 or the managed VM 122. The managed VM 122 may fail a hash check of a hash of all or a portion of the managed VM 122, or a signature verification of a digital signature of the managed VM 122.

User data 117 represents information about users who have user accounts in the enterprise. These users can also have one or more host devices 106 and one or more managed VMs 122 that are enrolled as managed entities with the management service 120. User data 117 can include authentication data, and information about third-party services with which the user is assigned an account.

While host devices 106 can remain unenrolled, in some cases, the management service 120 can enroll host devices 106 for mobile device management services. To begin enrollment, the management service 120 can identify and authenticate one of the host devices 106 and store data related to the host device 106 in the management data 112 for later reference. In some cases, the management service 120 (or a management component, an application, or a component executing on the host device 106) can also be registered as a device administrator (at least in part) of the host device 106, permitting the management service 120 to configure and manage certain operating aspects of the host device 106.

Once the host device 106 is enrolled for device management by the management service 120, the management service 120 can direct the installation of various software components or applications on the host device 106. The software components can be configured on the host device 106 at the direction of the management service 120. Such software components can include, for example, applications, resources, libraries, and other related components.

The management service 120 can transmit policies 113, compliance rules, and configuration data for execution by and/or enforcement by a host management component on the host device 106. In that context, during or after enrollment, the management service 120 can retrieve or generate a set of management policies, compliance rules, and configuration data for the host device 106 and transfer those policies, rules, and data to the host device 106 for reference by the host operating system 151 and certain applications executing on the host device 106. The host management component or agent can be executed on the host device 106, and can retrieve and install compliance rules and configuration data for execution and/or enforcement on the host device 106. In other cases, the host device 106 can be unmanaged by the management service, and can lack policies, compliance rules, and configuration data that are enforced for the host user context.

The management service 120 can also transmit policies 113, profiles 114, compliance rules, and configuration data for execution by and/or enforcement by a guest management component of the managed VM 122. In that context, during or after enrollment, the management service 120 can retrieve or generate a set of management policies, compliance rules, and configuration data for the managed VM 122 and transfer those policies, rules, and data to the guest management component of the managed VM 122 for reference by a guest operating system and certain applications of the managed VM 122. A guest management component or agent executed as part of the managed VM 122 can retrieve and install compliance rules and configuration data for execution and/or enforcement on the managed VM 122. This process is discussed in further detail with respect to FIG. 3.

The management service 120 can also provide a management console as an engine and console interface for device management of the host devices 106. An information technology administrator or user, for example, can view, administer, and update the management policies, compliance rules, and configuration data on the host devices 106 using the management console. The policies, rules, and configuration data can be collectively administered for several of the host devices 106 by organizing the host devices 106 into several different groups or categories of devices according to enterprise or other factors or considerations. The management service 120 can ensure compliance of the host device 106 in conjunction with a management component and other instructions executed by the computing environment 103 and the host device 106.

The identity provider 121 can provide single sign-on or identity management capabilities for an enterprise, whether a user is interacting with a user interface of the managed VM 122, or a user interface of the host device 106. The identity provider 121 can allow users to authenticate his or her identity to obtain an authentication token that can be provided to a third-party service, which can include a data analysis service 107, a comparison service 108, a reporting service 109, and other services. The identity provider 121 can utilize OAuth, security assertion mark-up language (SAML), or other single sign-on methodologies. The identity provider 121 and management service 120 can communicate so that the management service 120 can revoke or authorize access to various services for users in the enterprise based on status of a host device 106 assigned to the user. The identity provider 121 can also rely on user data 117 in the data store 110. In some examples, the identity provider 121 can rely upon a separate source of user data in a separate data store.

A third-party service, including any one of the data analysis service 107, comparison service 108, and reporting service 109, can be embodied as one or more computers, computing devices, or computing systems. Like the computing environment 103, a third-party service can include one or more computing devices arranged, for example, in one or more servers or computer banks. The computing device or devices can be located at a single installation site or distributed among different geographical locations. Each of the third-party services can include a plurality of computing devices that together embody a hosted computing resource, a grid computing resource, or other distributed computing arrangements. The third-party services can also be embodied, in part, as certain functional or logical (e.g., computer-readable instructions) elements or modules as described herein. A third-party service can be provided by an enterprise to its users. The third-party service can federate its authentication for users of the enterprise to the identity provider 121. Alternatively, the data analysis service 107, comparison service 108, and reporting service 109, can be provided by the computing environment 103, and can be part of the management service 120.

The host devices 106 are representative of one or more host devices 106. Each host device 106 can be embodied as any computing device, processing circuit, or processor based device or system, including those in the form of a desktop computer, a laptop computer, a tablet computer, a personal digital assistant, a cellular telephone, a wearable computing device, or a set-top box, among other example computing devices and systems. Depending upon its primary purpose or function, for example, the host devices 106 can include various peripheral devices or components. The peripheral devices can include input or communications devices or modules, such as keyboards, keypads, touch pads, touch screens, microphones, cameras, wireless communications modules (e.g., infra-red, WI-FI, or BLUETOOTH®), buttons, switches, or sensors. The peripheral devices can also include a display, indicator lights, speakers, global positioning system (GPS) circuitry, accelerometers, gyroscopes, or other peripheral devices depending upon the primary purpose or function of the host devices 106.

An example host device 106 can also be enrolled by the management service 120 for device management. A host management component can be installed on a host device 106 to locally manage the device on behalf of the remotely executed management service 120. The management component can be installed with elevated privileges or be effectuated through the host operating system 151 application programming interfaces (APIs) to manage the host device 106 on behalf of the management service 120. The management component can have the authority to manage data on the host device 106, install, remove, or disable certain applications, or install policies 113, profiles 114, such as VPN certificates, Wi-Fi profiles, email profiles, etc.

The network 111 can include the Internet, intranets, extranets, wide area networks (WANs), local area networks (LANs), wired networks, wireless networks, cable networks, satellite networks, other suitable networks, or any combinations thereof. As one example, the computing environment 103 and the host devices 106 can be respectively coupled to one or more public or private LANs or WANs and, in turn, to the Internet for communication of data among each other. Although not shown in FIG. 1, the network 111 can also include communicative connections to any number and type of network hosts or devices, such as website servers, file servers, cloud computing resources, databases, data stores, and any other network or computing architectures.

In the networked environment 100, the computing environment 103, the host devices 106, and other services can communicate data among each other over the network 111 using one or more network transfer protocols or interconnect frameworks, such as hypertext transfer protocol (HTTP), simple object access protocol (SOAP), representational state transfer (REST), real-time transport protocol (RTP), real time streaming protocol (RTSP), real time messaging protocol (RTMP), user datagram protocol (UDP), internet protocol (IP), transmission control protocol (TCP), other protocols and interconnect frameworks, and combinations thereof.

The managed VM 122 can include a managed VM configuration file 124 and a NVRAM file 126, virtual disk (.vmdk) files, a log file, as well as additional files and data. The managed VM 122 can include a guest operating system and a number of applications, certificates, Wi-Fi profiles, email profiles, and other data. The managed VM 122 can be enrolled with, and managed using, the management service 120. The managed VM 122 can be preconfigured to communicate with one or more management endpoints of the management service 120. The managed VM 122 can include the certificates, credentials, and a management endpoint address to enable this communication. In addition, the managed VM 122 can provide an endpoint to which the management service 120 can transmit or push commands that can be performed by a management agent, service, or component executed within the managed VM 122. The managed VM 122 can also periodically check in with the management service 120 to provide operational information, as well as to retrieve commands to perform.

The managed VM 122 can utilize guest identity coupling with host device 106 identity. For example, a hostname-detecting instruction for the managed VM 122 can be specified as part of the authoring and packaging process. In some cases, an identity of the host device 106 can be identified and can be used as an identity of the managed VM 122. Alternatively, the identity of the host device 106 can be modified or used in combination with other identifiers, and the modified version of the host identity can be used as an identity of the managed VM 122.

The managed VM configuration file 124 can include a textual or other configuration file, which can store settings chosen during creation of the VM through a console user interface of the management service 120, or another VM settings editor. This can include a .cfg, .vmx, or another file extension. The managed VM configuration file 124 can include file properties that are not included in a typical VM or its configuration file. For example, the managed VM configuration file 124 can include the managed VM configuration parameters as indicated in Table 1, among other parameters. The NVRAM file 126 can be a nonvolatile RAM file that can include items that cannot be stored in volatile memory, such as vTPM if present, as well as the BIOS.

These files can change infrequently and are relatively small in size relative to the whole managed VM 122. The VM password or credentials can be automatically generated and encrypted and stored in a user login keychain for MacOS® or alternatively protected using a data protection API for Windows®. This provides a high key strength and simplicity to the user. In traditional models, if the user forgot their password, the content of the VM could be lost. This either leads to weak passwords or lost data.

The management service 120 can include a packaging tool 130 that packages a base VM into a managed VM package for a managed VM 122. While the packaging tool 130 can be accessed through a console user interface of the management service 120, the packaging tool 130 can also be installed and executed on another computing environment such as an administrator's personal computing device, a host device 106, or another device. The packaging tool 130 can modify a VM base image into a managed VM 122 by writing a managed VM configuration file 124 into the VM base image. This can include modifying a VM configuration file of the VM base image by writing managed virtual machine configuration parameters into the VM configuration file.

that a signer certificate is valid, trusted and not revoked. In some cases, if the package was not signed, no verification is performed.

Add the managed VM 122 to the host desktop hypervisor 203 inventory of VMs.

Notify the user that the VM is available to use, using a toast notification or another notification.

Provide a user interface element that lists all managed VMs 122 on the host device 106.

Once the provisioning process is completed, a user or provisioning tool 131 can cause the host desktop hypervisor 203 (FIG. 2) to execute the managed VM 122 for the first time. If the auto-add vTPM option is set to software or set to ON in the managed VM configuration file 124, then the host desktop hypervisor 203 can add or create a vTPM

TABLE 1

| Mngd. VM Config. Parameters | Default if not set | Range | Description |
|---|---|---|---|
| managedVMintegrity Constraint | FALSE | FALSE . . . TRUE | Whether the UI is locked or not, editability status of settings. Added at packaging time. |
| managedVM.org DisplayName | ""—i.e. empty string | String | Enterprise or organization name to be displayed in the UI when the settings are managed through the host desktop hypervisor 203 or a UI of the managed VM 122. Added at packaging time. 256 characters or another predetermined number of characters. |
| managedVM.groupID | ""—i.e. empty string | String | The group ID in management service 120—used for compliance check. The group ID can refer to an enterprise identifier or a user group identifier. This can be formatted based on the group ID formatting for the management service 120. For example, 20 characters, must only contain alphanumeric characters, hyphens and underscores. Added at packaging time. |
| managedVM.ID | ""—i.e. empty string | universally unique identifier (uuid) | The managed VM uuid—used for managed vm identification. Added at provisioning time. |
| managedVM.autoAdd VTPM | ""—i.e. empty string | 'none', 'software', 'hardware' OR 'yes', 'no' | Specifies a type of encryption to use for encryption keys (TPM/vTPM) Security level for the managed VM: 'none': no encryption, 'software': partially encrypt the VM (home files), vTPM added. vTPM is added at provisioning time, 'hardware': TPM and T2 usage. |

The management service 120 can include a provisioning tool 131 that provisions a managed VM 122 on a host device 106. While the provisioning tool 131 can be stored by the management service 120, the provisioning tool 131 can also be installed and executed on a host device 106. The provisioning tool 131 can also be included in a management component or agent installed on the host device 106 for implementing commands provided by the management service 120.

The provisioning tool 131 can initiate and implement a provisioning process. The provisioning process can use a managed VM package to install, configure, and launch a managed VM 122. The provisioning tool 131 can generate and implement command line arguments as well as scripts, API calls and operating system calls. The provisioning tool 131 can:

Extract the VM files from the managed VM package to a predetermined folder location.

Verify a digital signature included with the managed VM package, including comparing hashes and verifying device to the managed VM 122 using partial encryption and automatic key generation as described. If a user interface locking feature is enabled based on the editability status for editing settings of the managed virtual machine through a host desktop hypervisor 203, the user will not be able to change a predetermined set (or any) of VM settings from the user interface of the host desktop hypervisor 203. The managed VM 122 can be accessed in an out of box experience (OOBE) process if the sysprep or other audit mode instructions have been completed. The enrollment grace period timer can start once the managed VM 122 is executed for the first time and the OOBE process has started. A user can complete the OOBE and begin to use the managed VM 122.

Figure 2:
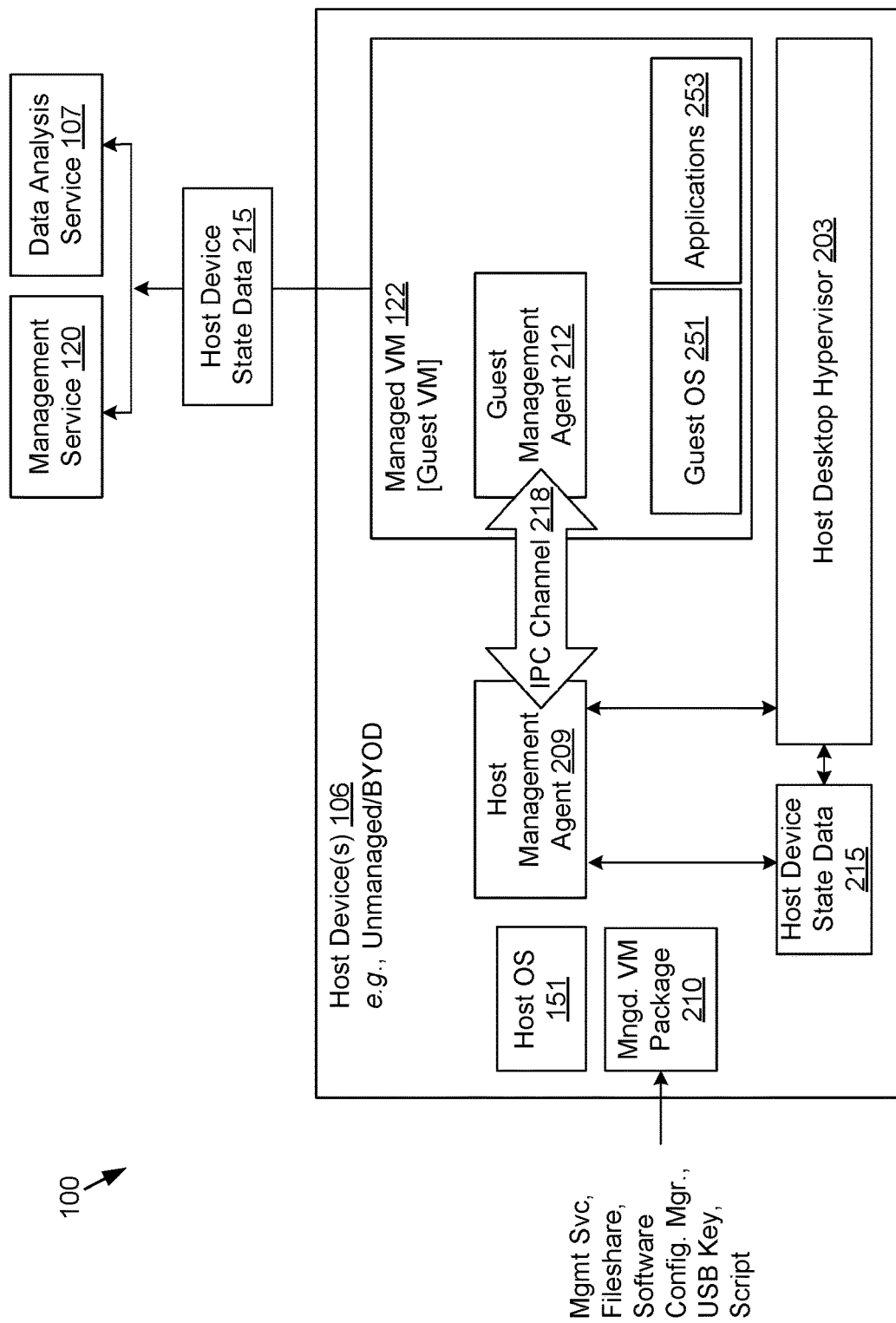
FIG. 2 illustrates an example of packaging a managed virtual machine package and provisioning a managed virtual machine to a host device using components of the networked environment, according to various examples described herein.

FIG. 2 can illustrate an example of packaging a managed virtual machine package 210 and provisioning a managed VM 122 to a host device 106 using components of the networked environment 100. The managed VM package 210 can be used as a provisioning package to install the managed VM 122 on the host device 106.

The host device 106 can include a host desktop hypervisor 203, a host management agent 209, and a managed VM 122. In some cases, the host management agent 209 can be part of a suite of management instructions or components associated with the management service 120, and can be used in concert with a guest management agent 212 for management of the managed VM 122. The host management agent 209 can receive or identify the managed VM package 210, and install the managed VM 122 using the managed VM package 210.

The managed VM package 210 can include a guest operating system 251 and a number of applications 253, certificates, Wi-Fi profiles, email profiles, and other guest user context configurations. The managed VM package 210 can also include enterprise data that is accessed by the applications and guest operating system 251 of the managed VM 122. The managed VM package 210 can further include links or addresses to create and access network drives and network services that provide the enterprise data.

The management service 120 can include a console user interface through which an administrator or other user can design the managed VM 122 and its managed VM package 210. In order to prepare the managed VM 122, the management service 120 can generate a user interface through which a user can author a generalized Windows® or other VM desktop image. The VM base image can include the guest operating system 251 as well as any applications 253 that are required for the base image. The user can select applications, certificates, Wi-Fi profiles, email profiles, data stores, network drives, and data that can be included in the managed VM package 210.

The management service 120 can also validate that the VM base image for the managed VM 122 meets the managed VM rules that include packaging rules and Data Loss Prevention (DLP) rules for managed desktop VMs 122. The managed VM 4 rules can include requirements as well as recommendations.

Managed VM rules can specify requirements for the base image of the managed desktop VMs 122. For example, the requirements can include:
  Not a linked clone
  No snapshots or linked clone VM derived from the VM
  No virtual disk files (e.g., .VMDK files) that are not dedicated to the VM (virtual disk files must be dedicated to the VM)
  The VM must not be marked as a template
  The VM working directory must be a current directory containing the VMX
  Minimum VM hardware version (e.g., >=14)
  Windows® 10 or another acceptable guest operating system
  Firmware type must be UEFI
  Only boot from HDD is permitted (no network or CD-ROM booting)
  Network devices must be bridged or NAT only (host-only and custom adapters not permitted)
  CD/DVD devices must be pass-through or "raw" devices only (i.e. not mapped to an ISO file)
  Floppy drives devices are not permitted
  Parallel port and virtual printer devices are not permitted
  Serial port devices are not permitted
  Pass-through SCSI devices are not permitted
  All HDD devices must map to virtual disk files ("raw" device pass-through is not permitted)
  virtual disk files must exist in the same directory, to limit the chance of packaging a shared virtual disk file
  Camera devices are not permitted
  USB devices other than Hub and HID devices are not permitted
  Pass-through to host sound card devices are not permitted
  Shared folders must be disabled
  Option to snapshot the VM on power off must be disabled
  The AutoProtect rolling snapshotting feature must be disabled
  VNC connections must be disabled
  All appliance view settings including port must not be set
  Proxy app support either host-to-guest or guest-to-host must be disabled Recommendations for the managed VM rules can include:
  Enable secure boot
  Do not share Bluetooth devices with the host
  Disable guest isolation drag-and-drop
  Disable guest isolation copy-and-paste
  Do not synchronize guest time with the host
  Do not use Tool scripts
  Do not gather VM debug information
  Do not clean up disks after VM shutdown The management service 120 can also sign and package the managed VM 122 into a managed VM package 210 in a format that can deployed with any of: product cost and life cycle management (PCLM), system center configuration manager (SCCM), active directory (AD) or other products; a UEM or mobile device management (MDM), such as the management service 120 or a legacy management service; manual or enterprise script-based deployment using a removable drive, a file share, an FTP, or similar systems.

The management service 120 or the host management agent 209 can include a packaging tool 130 that packages a base VM into a managed VM package 210. The packaging tool 130 can generate and implement command line arguments as well as scripts, API calls and operating system calls. The packaging tool 130 can:
  Provide a user interface through which a powered-down VM can be selected. For example, a .vmx file of a VM that has been designed through the user interface, or another VM can be selected for distribution as a managed VM 122.
  Perform checks on the base VM to ensure an acceptable configuration for a managed VM 122 based on the managed VM rules outlined above.
  Provide a user interface through which a managed VM enterprise identifier can be entered, selected, or otherwise added to the VM .vmx file. The managed VM enterprise identifier can be associated with a set of enterprise-specific policies, baselines, profiles, applications, certificates, and other enterprise resources 119 to be included in a user context configuration of the managed VM 122.
  Provide a user interface through which an enterprise display name can be entered, selected, or otherwise added to the VM .vmx file.
  Provide a user interface through which a user group identifier can be entered, selected, or otherwise added to the VM .vmx file. The user group can be associated with a set of user group-specific policies, baselines, profiles, applications, certificates, and other enterprise resources 119 to be included in a user context configuration of the managed VM 122.
  Generate a digital signature based on an admin-provided certificate such as an enterprise certificate or a management service certificate. The single digital signature or multiple digital signatures can be generated based on the certificate and one or more of: the managed VM configuration file 124 (or a subset of protected configuration settings within the managed VM configuration file 124), the virtual disk .vmdk file or files, and the NVRAM file 126.

Provide a user interface through which a user can enter or select an enrollment grace period or period of time within which the managed VM 122 must enroll, re-enroll, check in, or otherwise contact the management service 120 to maintain enrollment. In some examples, the packaging tool 130 can require the enrollment grace period to be set to a time period of 90 days or less.

Provide a user interface through which a user can specify a cryptographic method that indicates whether a hardware-based crypto-processor, or a software-based or virtualized crypto-processor is to be used. The packaging tool 130 can include a user interface through which a user can create, install and uninstall command-line arguments and scripts to use for PCLM, MDM, or manual deployment and provisioning.

The managed VM configuration file 124 can include protected parameters that are identified by the packaging tool 130 at packaging time. These protected parameters can include a selected set of the managed VM enterprise identifier, the enterprise display name, the user group identifier, the grace period, the security level or cryptographic method, and others as discussed.

The packaging tool 130 can generate the managed VM package 210 to include a .ppkg file and an unattend.xml file. The .ppkg file and an unattend.xml file can be copied to the managed VM 122. The .ppkg file can include the files of the managed VM 122 as well as enterprise- and user-group-specific policies, baselines, profiles, applications, certificates, and other enterprise resources 119. The files of the managed VM 122 can include a managed VM configuration file 124, an NVRAM file 126, virtual disk (.vmdk) files, a log file, as well as additional files and data. The managed VM package 210, or the .ppkg, can also include a signature and a number of additional files that are not part of the managed VM 122, or the signature. For example, a signing verification or signed parameter file, as well as other configuration files. The packaging tool 130 can identify or receive the enterprise resources 119 from the management service 120 based on a request that includes the managed VM enterprise identifier and the user group identifier.

Once packaged, the managed VM package 210 can be distributed to the host device 106 by the management service 120, a third-party or legacy PCLM, SCCM, AD, UEM, MDM, or other management service, manually, or using a script. The managed VM package 210 can be accessed during deployment through a removable drive connected to the host device 106, a file share accessed by the host device 106, an FTP, or similar systems. The management service 120 can, in some cases, distribute the managed VM package 210 to the host device 106 once the host management agent 209 and the host desktop hypervisor 203 are installed.

The managed VM package 210 can be delivered to the host device 106 using a USB or other removable drive, a fileshare, a software configuration manager, a script that retrieves the managed VM package 210, or from the management service 120 or another management service. When the management service 120 or another management service is used to direct the download and installation of the managed VM package 210, a management component installed on the host device 106 can be utilized. The host management component can check in with the management service 120 or a legacy management service and identify a command to retrieve and install the managed VM package 210. The host management component can then use the host desktop hypervisor 203 to install and launch the managed VM 122. In some cases, the host management component can install the host management agent 209 and host desktop hypervisor 203 from the managed VM package 210 or separately.

A provisioning tool 131 can be included with the host management agent 209 or can be provided separately. In some cases, the provisioning tool 131 can automatically select the .ppkg file and an unattend.xml file from the managed VM package 210, or can provide a user interface through which a user can select the .ppkg file and an unattend.xml file, and a user interface element to install the managed VM package 210.

The provisioning tool 131 can verify authenticity and integrity of the managed VM package 210 based on a managed VM digital signature that is based on a management service 120 or enterprise certificate. Once the authenticity and integrity of managed VM package 210 is verified, the host management agent 209 can setup host-device-specific VM settings including adding a vTPM device with encryption and generating a unique VM identifier for the managed desktop VM 122.

The provisioning tool 131 can also add the managed VM 122 to a VM inventory of the host desktop hypervisor 203 of the host device 106. The host management agent 209 can then notify a user of the host device 106 that the managed VM 122 is ready for use.

The host desktop hypervisor 203 can prepare a Windows® 10 or another type of managed VM 122. The host management agent 209 or the host desktop hypervisor 203 can place the host device 106 into audit mode. This can be achieved by causing the host device 106 to execute sysprep from the Windows® directory or another set of instructions that configure the host device 106 to boot into an audit mode.

The managed VM 122 can include a number of security features that can protect and isolate the guest environment of the managed VM 122 from the host environment. This can include automatic provisioning of a vTPM device using partial VM encryption and a credential generation model which can be used by the guest to protect Bitlocker® and other keys and credentials using a vTPM device. Management-service-enforced configurations such as policies, profiles, and restrictions, can be enforced based on the managed VM package 210. The managed VM package 210 can be signed to ensure authenticity and integrity. The managed VM package 210 can include a signature and a signed parameter file. The signed parameter file can include the managed VM configuration file 124, or all or a subset of the parameters from the managed VM configuration file 124. A managed VM user interface locking feature can prevent a user of the host device 106 from changing settings of the managed VM 122 from a host desktop hypervisor 203 user interface. Managed VM configuration file 124 parameters can be signed to prevent file tampering with respect to all, or a predetermined set, of parameters of the managed VM configuration file 124. This can include an option to automatically repair to a default set of parameters if the guest management agent 212, the host management agent 209, or the host desktop hypervisor 203 detect that the managed VM configuration file 124 parameters have been altered.

The host management agent 209 can communicate with the guest management agent 209 through an inter-process communication (IPC) channel 218. The IPC channel 218 can provide bidirectional guest-host and host-guest communications. In some examples, the host desktop hypervisor 203 can include a remote procedure call that can be utilized to provide the IPC channel 218. The host management agent 209 can include an application that runs in the user context ensuring no code runs in system context. The host management agent 209 can utilize host desktop hypervisor 203 APIs, such as REST APIs, VMREST APIs, and others. Host desktop hypervisors 203 can include, VMware® Workstation, VMware Fusion® and other desktop hypervisors.

To prevent managed VM 122 access and features from being utilized by non-enterprise, and non-management-service VMs, the host management agent 209 can enforce that the managed VM 122 desktop must be enrolled with the management service 120. The host management agent 209 can permit an enrollment grace period from the moment the managed VM 122 is first powered on, and/or when the managed VM 122 becomes unenrolled from the management service 120. If the guest management agent 209, or another component of the managed VM 122, does not enroll (or re-enroll) with the managed VM 122 and communicate the enrolled state to the host management agent 209 within the grace period, the managed VM 122 will be deactivated. For example, the managed VM 122 can be deactivated by setting the disable power on flag in the VMX file by calling or invoking a vmrest or other API provided by the host desktop hypervisor 203. If the user tampers with this setting, the host management agent 209 will continue to revert the disable power on flag.

The host management agent 209 or the guest management agent 209 can notify the user when nearing the end of the enrollment grace period. This warning might take the form of a Windows® toast message on either the host user context or the guest user context. The host management agent 209 can get a management service 120 enrollment state from the guest management agent 209 through the IPC channel 218 at regular intervals. If the guest management agent 209 reports that the guest operating system 251 or another component of the managed VM 122 is not enrolled with the management service 120, or if the host management agent 209 becomes inactive or unreachable, the enrollment grace period timer is started. If nearing enrollment grace period expiry, the host management agent 209 or the guest management agent 209 can generate a notification that the managed VM 122 must be enrolled or re-enrolled to avoid being deactivated or deleted.

The notification can be triggered when the enrollment grace period is within 30, 14, 7, or another number of days from expiration. If the grace period expires without the guest management agent 209 reporting enrollment, the managed VM 122 can be deactivated or deleted. In some cases, the managed VM 122 can be deactivated for a predetermined deactivation period prior to being deleted from the host device 106. The host management agent 209 can continue to keep the managed VM 122 in a deactivated state, unless the managed VM 122 has been forced on or temporarily re-activated and becomes enrolled with the management service 120.

To allow for managed VMs 122 that are powered off for an extended period of time or infrequently, the host management agent 209 can track the enrollment grace period in number of "powered-on days" only. That is, usage of a day for the purposes of the enrollment grace period can be recorded if the managed VM 122 is powered on within any 24-hour period. This allows a user to go on a leave, holiday, or period of inactivity without expending the grace period.

To support re-activation of a deactivated managed VM 122, an admin can temporarily disable the host management agent 209 and reset the disabled power on flag for the deactivated managed VM 122. This can enable the managed VM 122 to boot, so that enrollment can be completed. This can be achieved using commands from the management service 120, a legacy management service, or another method. In other examples, the host management agent 209 can modify the deactivated managed VM 122 to an enrollment-only mode so that a user can run the managed VM 122 for enrollment purposes, preventing access to enterprise resources 119.

The host management agent 209 can enable collection and reporting of host device state data 215 to the management service 120 for compliance purposes. The host management agent 209 can query a subset of host state variables. The host management agent 209 can transmit or communicate them to the guest management agent 209 through the IPC channel 218. The guest management agent 209 can transmit the host device state data 215 to the management service 120 and the data analysis service 107. The host device state data 215 collected can vary based on the host operating system 151 and the type of the host device 106 to account for operating-system-specific features. The host device state data 215 can include:

Operating system type and version for the host operating system 151
  Operating system automatic update status enabled/disabled
  Hardware model
  Device serial number or unique device identifier
  Hardware security processor status including presence, specification, and status (e.g., T2 on MacOS®, TPM on Windows®)
  Device authentication and lock method and status
  Status of administrator privileges for the user
  Whether status of virtualization-based security (VBS) is active for Windows®
  Status of EUFI/secure boot
  Status and type of drive encryption (e.g., File Vault on MacOS®, Bitlocker or similar on Windows®)
  Status and settings of firewall
  Status and settings for anti-virus and other threat protection services
  Status of system integrity protection for MacOS®
  Status host device 106 enrollment, the identity of the management service 120, legacy management service, or third-party management service used
  Host name of the machine
  Whether host device 106 is domain joined or AAD joined
  Whether managed VM package 210 signature was verified at the time the managed VM 122 was provisioned
  Whether managed VM package 210 signature verifies/matches the current configuration file parameters for the managed VM 122

The host management agent 209 can also provide tamper protection for the .vmx or managed configuration file 124. The host management agent 209 can periodically check whether any of the set of restricted settings in the managed configuration file 124 have been altered or changed from a specified default setting based on the managed VM package 210 when packaged. The host management agent 209 can re-verify the signature of the managed configuration file 124 or a specified portion or protected subset of parameters of the managed configuration file 124. A result of this verification and the signing certificate can be communicated to the guest management agent 209 through the IPC channel 218. The guest management agent 209 can transmit this information to the management service 120 and/or the data analysis service 107. If any setting have been changed, this can be reported as a compliance failure and can be auto-corrected, replacing changed settings with those included in the original managed VM package 210, a verified version of the managed VM configuration file 124, or an verified version of protected parameters. A user interface notification can be provided indicating that the managed VM configuration file 124 was corrected. In other cases, the compliance failure can be reported or notified to an administrator through the console user interface of the management service 120. If the managed configuration file 124 is unsigned, then the user of the host device 106 is free to change the parameters.

The host management agent 209 can, in some cases, be installed on an unmanaged host device 106. Upgrading the host management agent 209 can be performed if the host management agent 209 reports an old version relative to a current version of the host management agent 209, a mismatched version relative to a current version of the guest management agent 209, or an incompatible version relative to a current version of the guest management agent 209. The guest management agent 209 can be upgradable using embedded services (ESR), commands from the management service, or another method. The guest management agent 209 can stream or otherwise transmit the updated or guest-matching version of the host management agent 209 to the current host management agent 209 through the IPC channel 218.

The guest management agent 209 can distribute the matching host management agent 209 pre-bundled with the guest management agent 209, or pull the matching host management agent 209 package (e.g., rather than the latest version) from a link, an address, or another network location. A pre-configured scheduled task for a task scheduling component on the host, which can be created at provisioning time, can detect this package and run the upgrade. This process can work without user input and without requiring a host reboot. If the package fails to install, the existing host management agent 209 can be closed and restarted and the schedule task can continue to retry at periodical intervals. The success or failure to update the host management agent 209 can be reported to the guest management agent 209 across the IPC channel 218. If the failures persists for a predetermined time or number of attempts, the guest management agent 209 can log this and report a compliance failure to the management service 120.

The guest management agent 209 can be an application that provides in-guest managed VM 122 services. The guest management agent 209 can use the host management agent 209 to perform host device 106 operations and queries on behalf of the guest management agent 209. For example, the guest management agent 209 can query for the version of the host management agent 209, push an update package or command to retrieve and install the update package for the host management agent 209, and query for the host device state data 215.

The guest management agent 209 can also respond to requests from the host management agent 209. For example, the guest management agent 209 can respond to a query for a version of the guest management agent 209, or a query for an enrollment state of the managed VM 122. The host management agent 209 can also provide notifications to the management service 120 and/or notifications within the managed VM 122 when VM configuration changes are made by the user. The host management agent 209 can also provide notifications to the management service 120 and/or notifications within the managed VM 122 in response to events that might impact the security of the managed VM 122, including any host operating system 151 changes.

The guest management agent 209 can handle and respond to host device state data 215 received from the host management agent 209. For example, the guest management agent 209 can periodically receive host device state data 215 from the host management agent 209 through the IPC channel 218. The host device state data 215 can be stored in the guest operating system 251 registry along with a timestamp. The guest management agent 209 or other instructions of the managed VM 122 can read these registry values and forward them to the data analysis service 107 and the management service 120. If the cached values are not present or are outdated based on the timestamp, the guest management agent 209 or other instructions of the managed VM 122 can report noncompliance to the data analysis service 107 and the management service 120.

The guest management agent 209 can identify failures to query or receive the host device state data 215, and can provide a desktop notification on either the guest or host desktop so that the user can take corrective action before their managed VM 122 is deactivated or goes out of compliance. For example, if the user has disabled the host management agent 209 process in some way, since the user can have admin privileges on a BYOD host device 106, this gives them a chance to fix the problem themselves. In some cases, the notification can include textual instructions for how to correct the problem.

The guest management agent 209 can provide guest user interface notifications within a user interface of the managed VM 122. This can be achieved by a toast notification or another notification generated by the guest management agent 209 or other applications of the managed VM 122. In some cases, the guest management agent 209 can generate the notification using the guest operating system 251 of the managed VM 122. Notifications can be generated in response to failure to communicate with the host management agent 209 for a predetermined time or predetermined number of attempts, changes to the host operating system 151 of the host device 106, changes to the managed VM configuration file 124, and any other host device state data 215 that indicates violation of policies 113 or profiles 114, such as the host drive not encrypted or inadequate host device 106 authentication.

The guest management agent 209 can periodically provide or respond to a host management agent 209 query for the management enrollment state. This can include an identification of all management services (including the management service 120 and other management services) that the managed VM 122 is enrolled with. This can enable a single-enrollment enforcement feature that ensures the managed VM 122 is only enrolled with the management service 120.

An enterprise identifier and/or group identifier can also be queried allowing the host management agent 209 to reconcile the organization identifier in the managed VM configuration file 124 with the actual values from the query. The user identifier for the logged-on user of the managed VM 122 can also be queried and reconciled with an approved user or list of approved users indicated in the managed VM package 210. Guest data remains isolated from the host, only a minimal set of data about the managed VM 122 is returned to the host management agent 209.

The IPC channel 218 can be achieved in a number of ways. For example, one type of IPC channel 218 can include a host-only network that involves provisioning a network device into the managed VM 122 and building the IPC channel 218 using that provisioned network device. This type of IPC channel 218 can support and enable communications using standard TCP/IP and other web-based protocols such as REST or gRPC.

Another type of IPC channel 218 can include a custom socket-based service using a remote procedure call (RPC) backchannel of the host desktop hypervisor 203. This RPC backchannel service can use vSockets, other VM communication interface (VMCI) socket capabilities.

Yet another type of IPC channel 218 can include a remote procedure call (RPC) backchannel of the host desktop hypervisor 203 that operates using vmrun and rpctools. This third type of IPC channel can allow any process running in the user context of the host device 106 to send and receive variables. This type of IPC channel 218 can be limited to passing key value pairs in an asynchronous variable passing manner.

The host desktop hypervisor 203 can be modified to support managed VMs 122. Partial encryption support, including VM protected settings encryption support can be included. For example, the host desktop hypervisor 203 can add a VTPM device to the managed VM 122 using partial encryption and automatic key generation if an auto-add vTPM option is set to software or ON in the managed VM configuration file 124. The host desktop hypervisor 203 can also support verification that a restricted or protected subset of the parameters of the VM configuration file 124 are unaltered prior to running the managed VM 122, while allowing unrestricted subset of the parameters of the VM configuration file 124 to be changed. The protected subset can include all or some of the managed VM configuration parameters.

The managed VM 122 can enforce rules based on profiles 114 or policies 113, and in response to commands from the management service 120. For example, the guest management agent 212 can identify a failure to comply with profiles 114, policies 113, and other statuses that affect the compliance status 115. Even if the host device 106 is unable to access the management service 120, the guest management agent 212 can perform predetermined remedial and other actions based on a failure to comply with a particular policy 113 or profile 114. The guest management agent 212 can also perform actions in response to commands received from the management service 120.

The guest management agent 212 can transmit a command to perform a certain data modification action through the IPC channel 218 to the host management agent 209. The action can include enterprise wipe, which can cause all data, including applications 253, and all enterprise resources 119 to be removed from the managed VM 122. In addition, the managed VM 122 can be removed from the host device 106 entirely. This can include a command to delete specified data from the managed VM 122, or to delete the managed VM 122 from a file system of the host device 106. The host management agent 209 can suspend or stop execution of the managed VM 122 using the host desktop hypervisor 203, and then delete the managed VM 122 or specified data. If only a subset of data from the managed VM 122 is to be removed, the managed VM 122 can be restarted thereafter.

The guest management agent 212 can also transmit a lock or unlock command for the managed VM 122 through the IPC channel 218 to the host management agent 209. The host management agent 209 can use the host desktop hypervisor 203 to prevent the managed VM 122 from executing. In some cases, the lock command can also prevent a user of the host device 106 from logging into the host desktop hypervisor 203, or prevent alteration of certain settings through a user interface of the host desktop hypervisor 203.

The guest management agent 212 can also cause the host management agent 209 to implement networking restrictions for network data originating from the managed VM 122.

Figure 3:
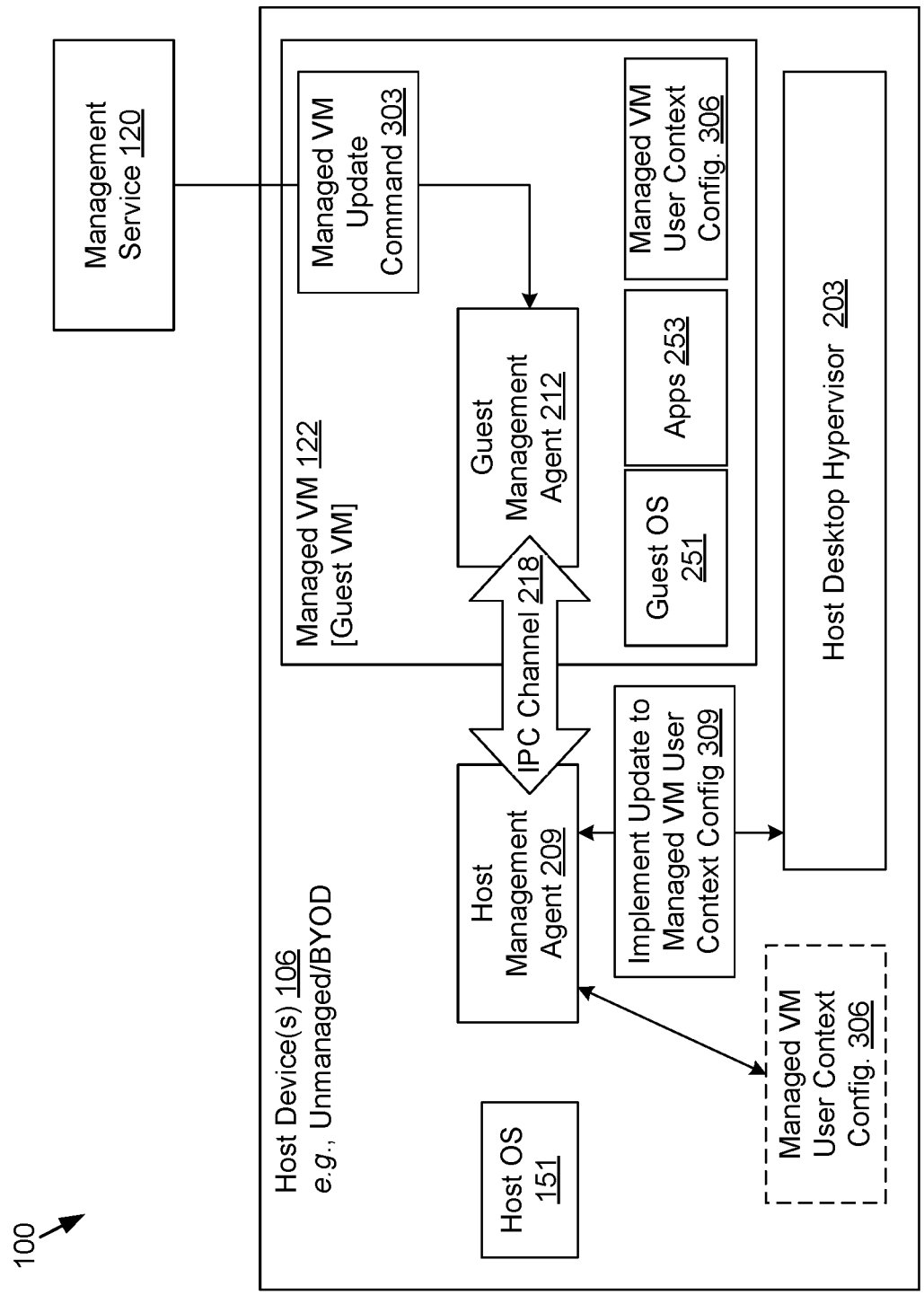
FIG. 3 illustrates an example of updating a configuration of a managed virtual machine using components of the networked environment, according to various examples described herein.

FIG. 3 illustrates an example of updating a managed VM user context configuration 306 of a managed VM 122 using components of the networked environment 100, according to various examples described herein.

The management service 120 can transmit a command to enforce or update a managed VM user context configuration 306. The command can include the managed VM user context configuration 306 or a link or address from which it can be downloaded. The managed VM user context configuration 306 can include profiles, policies, baselines, operating system updates for the guest operating system 251, applications to add or remove from the applications 253, certificates, and enterprise resources 119. Alternatively, the managed VM user context configuration 306 can identify links or addresses from which the respective profiles, policies, baselines, operating system updates for the guest operating system 251, applications to add or remove from the applications 253, certificates, and enterprise resources 119 can be downloaded.

The guest management agent 209 can receive the managed VM update command 303 from the management service 120. For example, the guest management agent 209 can check in with the management service 120 and retrieve the command from a command queue. Alternatively, the management service 120 can push or otherwise transmit the managed VM update command 303.

Once received, the guest management agent 209 can transmit or communicate the managed VM update command 303 from the guest management agent 209 through the IPC channel 218 to the host management agent 209. The guest management agent 209 can also transmit the managed VM user context configuration 306 across the IPC channel 218 to the host management agent 209. The managed VM update command 303 can specify that the managed VM 122 should be updated based on the managed VM user context configuration 306.

The host management agent 209 can temporarily or durably store the managed VM user context configuration 306 and the managed VM update command 303. The host management agent 209 can then implement the managed VM update command 303. The host management agent 209 can implement the managed VM user context configuration 306 using the host desktop hypervisor 203. In some cases, the changes can be implemented without restarting the managed VM 122. However, other changes can require the managed VM 122 to be taken offline and then restarted. The host management agent 209 can command the host desktop hypervisor 203 to take the managed VM 122 offline.

While the managed VM 122 is offline, the host management agent 209 can update the managed VM 122 to include profiles, policies, baselines, certificates, and enterprise resources 119, as well as apply operating system updates for the guest operating system 251, and add/remove applications from the applications 253. Once the changes are completed, the host management agent 209 can command the host desktop hypervisor 203 to launch or execute the managed VM 122.

In some cases, the managed VM 122 can be deleted and replaced with an updated managed VM 122 received for the managed VM update command 303. While some examples allow an enrollment status to carry over to a new or updated managed VM 122, other examples can require the updated managed VM 122 to be re-enrolled, and can refresh the enrollment grace period.

Figure 4:
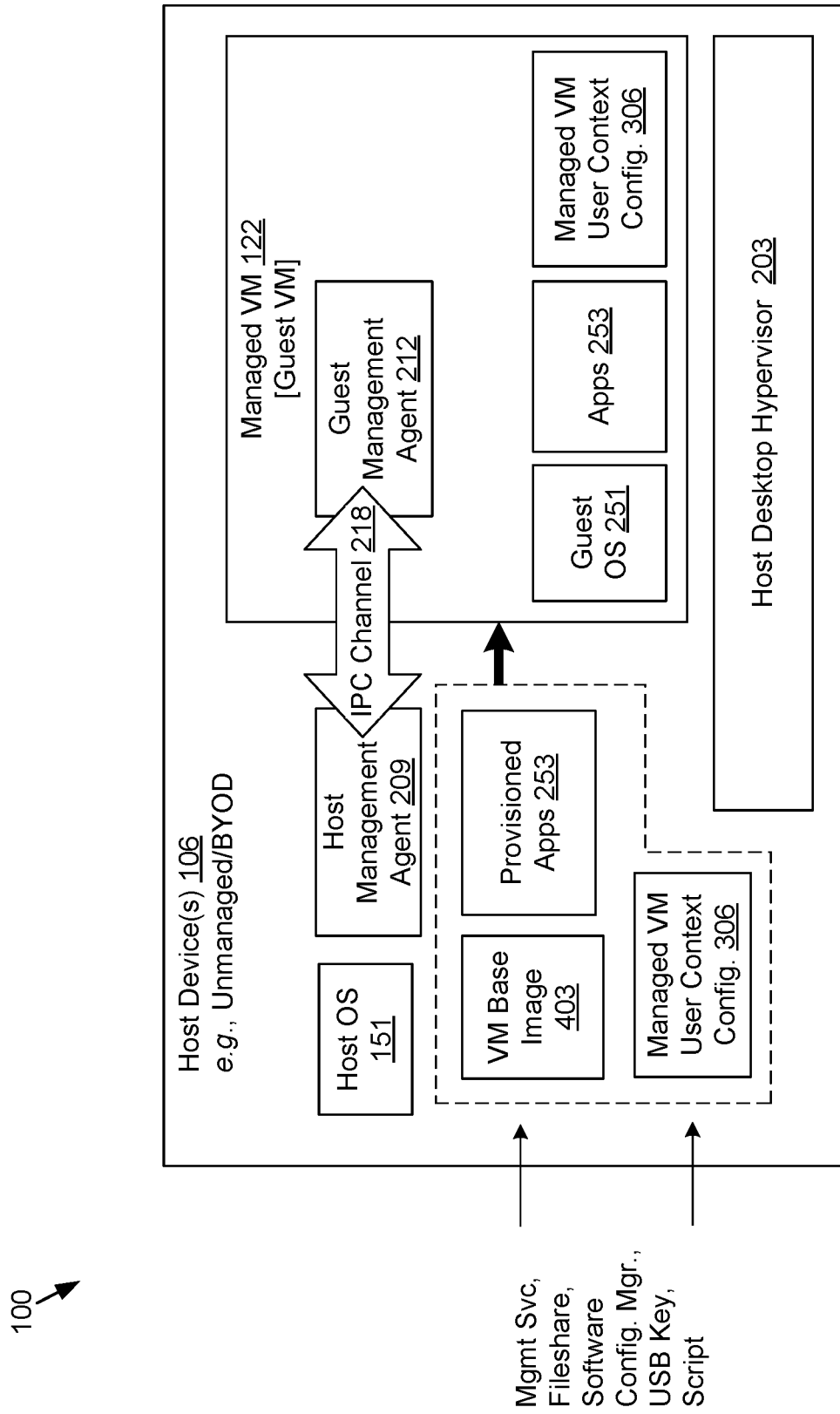
FIG. 4 illustrates an example of just-in-time assembly of a managed virtual machine using components of the networked environment, according to various examples described herein.

FIG. 4 illustrates an example of just-in-time assembly of a managed VM 122 using components of the networked environment 100, according to various examples described herein.

In some previously described embodiments, the managed VM 122 can be prepared and assembled by an administrator in their own computing environment manually or using the management service 120. This enables the administrator to prepare and validate the package. However, the components of the networked environment 100 can also work in concert for just-in-time assembly of the managed VM 122 on the destination host device 106. Just-in-time assembly can refer to packaging the managed VM package 210 on the end host device 106 prior to provisioning. This can allow for greater deployment flexibility and storage efficiency while requiring fewer complete managed VM packages 210.

A VM base image 403, applications 253, and a managed VM user context configuration 306 can be assembled on the host device 106. The VM base image 403 can be applicable to a wide array of different host devices 106 and user accounts with the management service 120. Thus, if the unattend.xml or the set of applications 253 changes, there is no need to repackage a new managed VM package 210.

The VM base image 403 can include a selected image that complies with the managed VM rules discussed above. The VM base image 403 can include a guest operating system 251. In some cases, the VM base image 403 can include a minimal subset of the applications 253 that are required for an entire enterprise, or a large group within the enterprise. The applications 253 can include enterprise-specific, device-specific, user-specific, and user group-specific applications. These applications can be identified based on an enterprise identifier, device identifier, user identifier, and user group identifier. The applications 253 can include application volumes and VMDK-based virtual disks which can be added to the managed VM 122, or can be accessed by the managed VM 122 without modifying the managed VM 122 itself. The application volumes and VMDK-based virtual disks can include multiple applications. The application volumes and VMDK-based virtual disks can reside on the host device 106 or a network location accessible by the host device 106 such as a local area network or a wide area network.

The managed VM user context configuration 306 can include profiles 114, policies 113, baselines, certificates, and enterprise resources 119. The managed VM user context configuration 306 can also specify a particular VM base image 403, and applications 253 or set of applications 253. The applications 253 can also be part of the managed VM user context configuration 306. The individual pieces can be delivered to the host device 106 using the methods described above for the managed VM package 210.

The host management agent 209 can include just-in-time assembly instructions, or any instructions or application outside the managed VM 122 can perform the assembly process. The host management agent 209 can use remote SSH, remote powershell, and other commands to carry out the assembly of the components into a managed VM package 210, which can then be installed as discussed with respect to FIG. 2. During assembly, the host management agent 209 can create application volumes and VMDK-based virtual disks, and configure the managed VM 122 to access or include an application volume or VMDK-based virtual disk based on a name, storage or datastore, path, and description.

Figure 5:
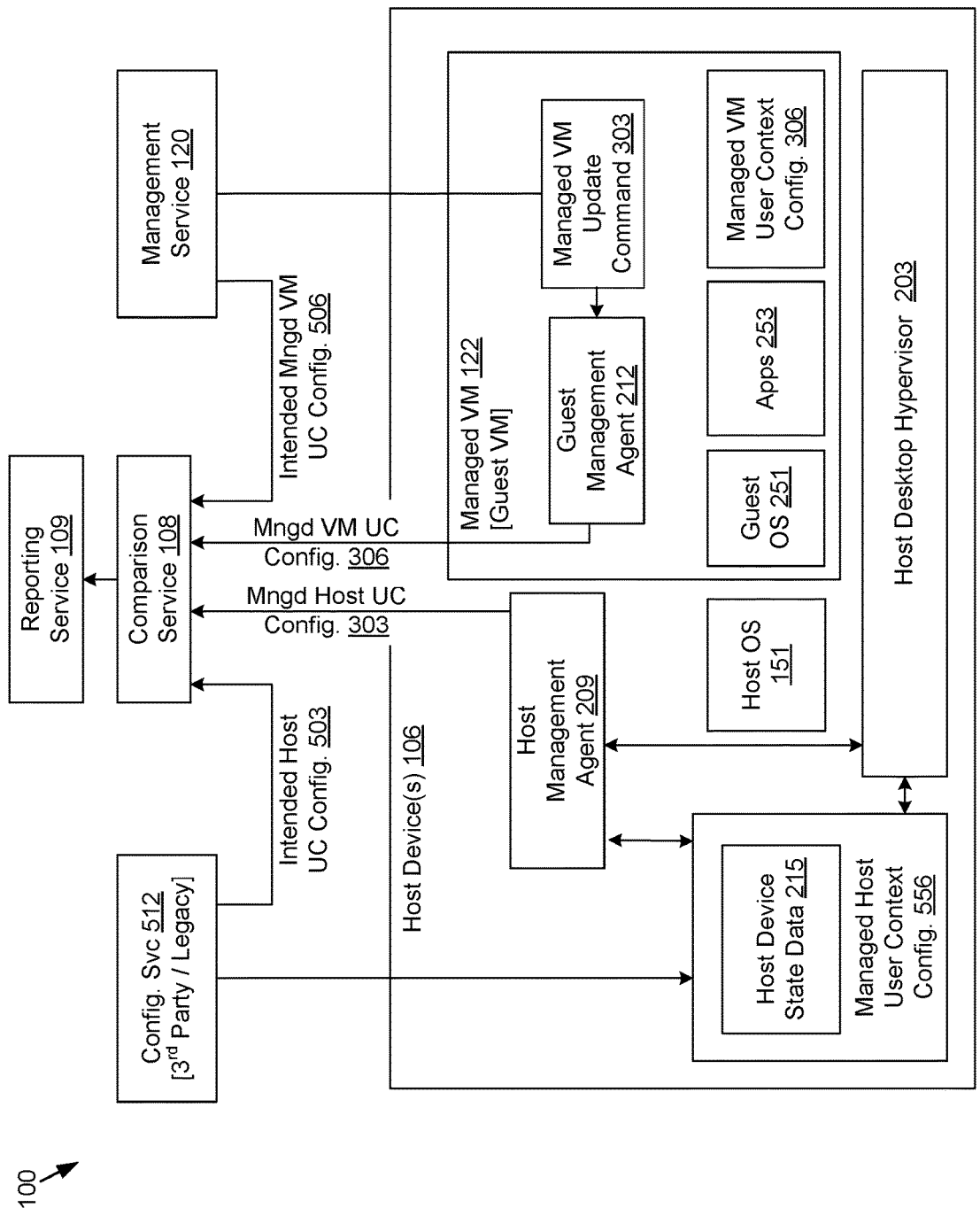
FIG. 5 illustrates an example of management of both a managed host device and a managed virtual machine using components of the networked environment, according to various examples described herein.

FIG. 5 illustrates an example of management of both a managed host device 106 and a managed VM 122 using components of the networked environment 100, according to various examples described herein. Here, the host device 106 can be managed by a configuration service 512, while the managed VM 122 can be managed by the management service 120. The comparison service 108 can compare the managed host user context configuration 556 to the managed VM user context configuration 306. Once the two user context configurations sufficiently match, the configuration service 512 can be phased out of use, and the management service 120 can be used for the host device 106.

The configuration service 512 can include a third-party or legacy or management service such as SCCM, Microsoft® Endpoint Management (MEM), AD via Group Policy, Desired State Configuration, or any other 3rd party PCLM system, custom scripts or other tools. These can be used individually and in combination to make changes to the managed host user context configuration 556 of the host device 106, and other host device state data 215.

The management service 120 can use MDM client and configuration service providers (CSPs) that implement modern CSP-based profiles 114. A CSP can refer to a set of instructions or an interface that is capable of reading, setting, modifying, and deleting configuration settings of the managed VM 122. These settings can map to registry keys, files, and other aspects of the managed VM user context configuration 306. A CSP can be provided with Windows® 10 or another guest operating system 251, as well as third-party or other management components, and can change states of the managed VM user context configuration 306. Third party tools can also modify the managed VM 122 and the managed VM user context configuration 306.

The managed VM user context configuration 306 can include all settings such as profiles 114, policies 113, certificates, applications 253, and enterprise resources 119 to support the needs of the user to do their work. If the host device 106 is irrecoverably damaged or lost, the managed VM user context configuration 306 can be re-applied onto a host device 106 and operate as before without manual intervention such as installing applications, applying patches, and manually reconfiguring the guest operating system 251. A managed VM 122 and the management service 120 can support management using policies 113.

This example shows how legacy management by the configuration service 512 is replaced with modern management by the management service 120. Traditional group policies 113 can sprawl leading to inflexibility and high management costs for operating the configuration service 512. This is one motivation why some enterprises want to simplify environments by migrating to modern management using the management service 120. The transition process itself can be difficult and costly. Profiles 114 on certain guest operating systems 251 only support a subset of what is provided by the various legacy group policies 113. Migrating from legacy group policy structures to CSP and other profile-based management by the management service 120 can be complex and time consuming. It can be challenging to translate each policy 113 to an equivalent profile 114. It can also be challenging to decide which policies 113 to translate, and which policies 113 can be retired.

To alleviate this burden during transition, some systems can include a co-management feature, allowing dual legacy SCCM and modern MDM management on the same device with a built-in mechanism to resolve configuration conflicts. However, the present disclosure prevents the potential for conflicts and disruptive changes of co-managing the host operating system 151 by only using modern profile-based management on the guest operating system 251 of the managed VM 122. As changes are made to the guest operating system 251 and the managed VM user context configuration 306, the user is encouraged to use and test out the new local VDI environment ensuring that the applications 253 behave as they expect, and the data is available to do their job.

For individual applications, using host desktop hypervisor 203 features, the applications selected from the host start menu or otherwise from the host operating system 151 can actually be executed within the guest operating system 251 of the managed VM 122. The application can then be presented seamlessly on the desktop user interface of the host operating system 151. This provides a full isolation model as compared to co-management, which can result in conflicts when the management service 120 and the configuration service 512 attempt to manage the same host operating system 151 concurrently. Changes to the managed host user context configuration 556 do not affect the managed VM user context configuration 306. Likewise, changes to the managed VM user context configuration 306 do not impact the managed host user context configuration 556. When the user and administrator are satisfied that the guest environment provided using the managed VM 122 is working reliably and operating as expected, the transition can be finalized with high confidence.

There are several options on how to phase out legacy management of the host device 106 by the configuration service 512. For example, the managed VM 122 can be converted into a physical disk image to be used to re-image the host device 106. Thereafter, the managed VM 122 can be removed. Alternatively, the transition can involve any of:

- A new host device 106 with a factory Windows 10 image (or customized factory provisioned image) can be bought and the management service 120 can configure the managed host user context configuration 556 to match the managed VM user context configuration 306, including the applications 253 and the operating system and type of the guest operating system 251.
- The existing host device 106 can be reimaged to a base image or organization-customized image, and the management service 120 can configure the managed host user context configuration 556 to match the managed VM user context configuration 306. This can provide a clean slate, preventing lingering legacy management configurations to be left on the host device 106.
- The existing host device 106 can be enrolled with the management service 120 once the matched managed host user context configuration 556 sufficiently matches the managed VM user context configuration 306. The host device 106 can be un-enrolled from the configuration service 512 or legacy management service. This can lead to issues of leftover configuration from legacy management.

The comparison service 108 can be hosted as-a-service in the cloud or on-premises, and can be separate from or included in the management service 120. Alternatively, the comparison service 108 can be executed on the host device.

The comparison service 108 can compare the managed host user context configuration 556 with the managed VM user context configuration 306, reconcile configuration differences between the two, and identify conflicts and missing items. For an individual host device 106, comparison service 108 can compare the managed host user context configuration 556 with the managed VM user context configuration 306. The managed host user context configuration 556 can refer to the applied or actual state of the host, and the managed VM user context configuration 306 can refer to the applied or actual state of the guest. managed host user context configuration 556 can include host device state data 215, and can also identify all applications on the host device 106 that are not within or part of the managed VM 122. In order to identify these actual states, the host management agent 209 can query the host device 106 and the host operating system 151 for the host device state data 215, including the managed host user context configuration 556. This can include one or more requests to multiple different components of the host device 106 and the host operating system 151.

The host management agent 209 can then provide the managed host user context configuration 556 to the comparison service 108. The comparison service 108 can transmit a host state request to the host management agent 209 that specifies a set of parameters comprising the managed host user context configuration 556. The host management agent 209 can query for these parameters and return them to the comparison service 108. Alternatively, the host management agent 209 can be preconfigured to query for and provide the managed host user context configuration 556 to the comparison service 108.

The guest management agent 209 can query the guest operating system 251 and the managed VM 122 to identify the managed VM user context configuration 306. This can include one or more requests to multiple different components of the guest operating system 251 and the managed VM 122. The guest management agent 209 can then transmit the managed VM user context configuration 306 to the comparison service 108. The comparison service 108 can transmit a guest state request to the guest management agent 209 that specifies a set of parameters comprising the managed VM user context configuration 306. The host management agent 209 can query for these parameters and return them to the comparison service 108. Alternatively, the guest management agent 209 can be preconfigured to query for and provide the managed VM user context configuration 306 to the comparison service 108.

The configuration service 512 can provide an intended host user context configuration 503 to the comparison service 108 periodically or in response to a host state request. The management service 120 can provide an intended managed VM user context configuration 506 to the comparison service 108 periodically or in response to a guest state request. This can avoid data acquisition from the host device 106 endpoints, removing the complexities and scale issues acquiring data from many host devices 106.

The comparison service 108 can perform comparisons for all host devices 106 or sample sets of host devices 106 based on the combinations of policies 113 and profiles 114 applied. Results of comparisons can be consumed by the administrator via a form of reporting service 109, which can be part of the management service 120, or can be a separate service. The comparison service 108 can notify an administrator using the reporting service 109 in order to identify discrepancies in configuration that should be addressed. The reporting service 109 can identify:

1. Policies 113 that have been migrated to profiles 114.
2. Policies 113 incorrectly migrated (for instance, migrated with the wrong value—e.g. old policy says block firewall port 80, new profile 114 allows/fails to block firewall port 80).
3. Policies 113 not migrated to profiles 114.
4. New profile 114 that does not have an original matching policy 113 defined.

The comparison service 108 can be provided along with or separately from the management service 120 to provide customers migration of legacy Active Directory and other group policies 113 to modern MDM profiles 114. The comparison service 108 can include a complex translation matrix that describes how to map each specific policy 113 to modernized profiles 114. This technology can include two-way comparisons of all policy 113 and profile 114 settings. Since some policies 113 have no equivalent or straightforward mapping to MDM or CSP-based profiles 114, the comparison service 108 can qualify the impact of not mapping a particular setting of a policy 113. For example, the comparison service 108 can indicate that an application applicable to the policy 113 or setting is for a particular application or operating system feature, along with an indication of usage rate of that application or operating system feature. In some cases, the comparison service 108 can provide a recommendation for whether the policy 113 can be ignored, de-prioritized, or be removed (i.e., remain untranslated and unmigrated) based on the usage rate of the affected application or operating system feature.

Since the host device 106 and managed VM 122 are separately managed, the host device 106 can be used as a fallback environment if the managed VM 122 becomes misconfigured. This allows the administrator to have flexibility to experiment and tune the modern management devices during the transition period. However, with existing co-management systems, the risk of conflict remains. One conflicting change can easily lead to large numbers of misconfigured devices and downtime.

Figure 6A:
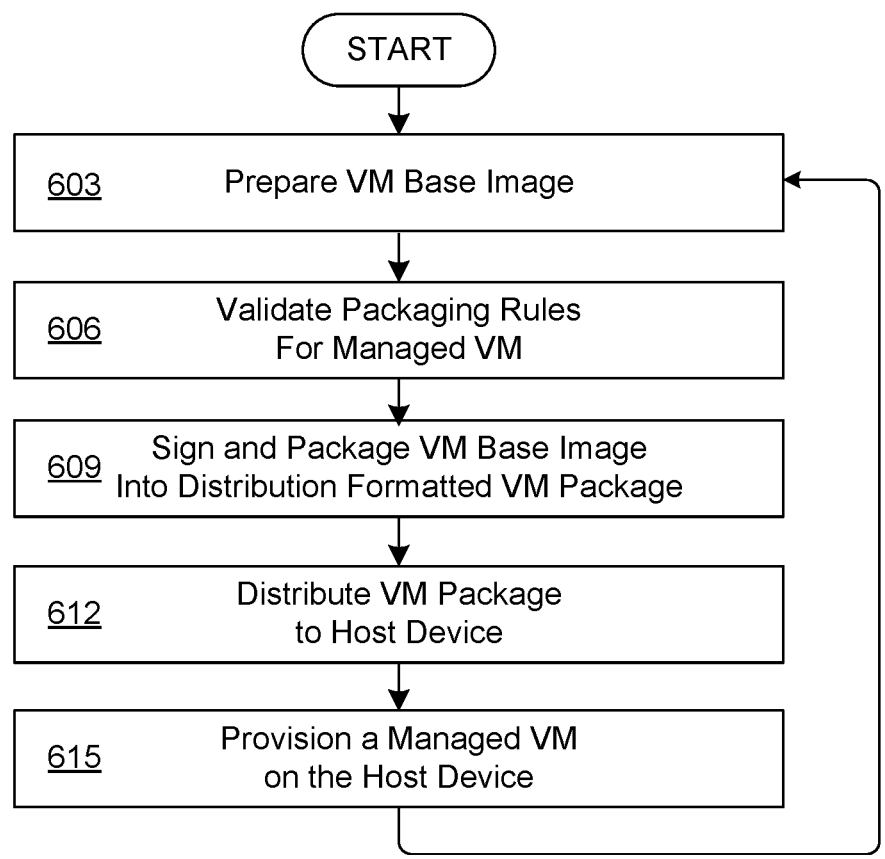
FIG. 6A illustrates a flowchart performed by components of the networked environment, according to various examples described herein.

FIG. 6A shows a flowchart performed by components of the networked environment 100. Generally, the flowchart illustrates how components of the networked environment 100 work in concert to package and provision a managed VM 122 on a host device 106.

At step 603, a packaging tool 130 can prepare a VM base image 403. The management service 120 or the managed VM service can include the packaging tool 130. The packaging tool 130 packages a base VM into a managed VM package 210. The VM base image 403 can include the guest operating system 251 as well as any applications 253 that are required for the base image. Through a user interface of the packaging tool 130, the user can select applications, certificates, Wi-Fi profiles, email profiles, data stores, network drives, and data that can be included in the managed VM package 210. Alternatively, the packaging tool 130 can generate a user interface through which a powered-down preconfigured VM can be selected. For example, a .vmx file of a VM that has been previously designed and executed can be selected for distribution as a managed VM 122.

At step 606, the packaging tool 130 can validate that the VM base image 403 for the managed VM 122 meets managed VM rules that include packaging rules and Data Loss Prevention (DLP) rules for managed desktop VMs 122. The managed VM rules can include requirements as well as recommendations. For example, the requirements can include:

Not a linked clone
No snapshots or linked clone VM derived from the VM
No virtual disk files (e.g., .VMDK files) that are not dedicated to the VM
The VM must not be marked as a template
The VM working directory must be a current directory containing the VMX
Minimum VM hardware version (e.g., >=14)
Windows® 10 or another acceptable guest operating system
Firmware type must be UEFI
Only boot from HDD is permitted (no network or CD-ROM booting)
Network devices must be bridged or NAT only (host-only and custom adapters not permitted)
CD/DVD devices must be pass-through or "raw" devices only (i.e. not mapped to an ISO file)
Floppy drives devices are not permitted
Parallel port and virtual printer devices are not permitted
Serial port devices are not permitted
Pass-through SCSI devices are not permitted
All HDD devices must map to virtual disk files ("raw" device pass-through is not permitted)
virtual disk files must exist in the same directory, to limit the chance of packaging a shared virtual disk file
Camera devices are not permitted
USB devices other than Hub and HID devices are not permitted
Pass-through to host sound card devices are not permitted
Shared folders must be disabled
Option to snapshot the VM on power off must be disabled
The AutoProtect rolling snapshotting feature must be disabled
VNC connections must be disabled
All appliance view settings including port must not be set
Proxy app support either host-to-guest or guest-to-host must be disabled Recommendations can include:
Enable secure boot
Do not share Bluetooth devices with the host
Disable guest isolation drag-and-drop
Disable guest isolation copy-and-paste
Do not synchronize guest time with the host
Do not use VMware® or other proprietary tool scripts
Do not gather VM debug information
Do not clean up disks after VM shutdown If the VM base image 403 does not comply with the packaging rules, then the packaging tool 130 can modify the VM base image 403 to comply with the packaging rules. The packaging tool 130 can also generate a user interface that specifies changes to the VM base image 403 that modify the VM base image 403 to comply with the packaging rules. A user can select a user interface element to accepts the changes, and the packaging tool 130 can modify the VM base image 403 to comply with the packaging rules.

At step 609, the packaging tool 130 can sign and package a managed VM 122 into a managed VM package 210 that is formatted for distribution. The packaging tool 130 can generate and implement command line arguments as well as scripts, API calls and operating system calls. The packaging tool 130 can Provide a user interface through which a managed VM organization identifier can be entered, selected, or otherwise added to the VM .vmx file. The managed VM organization identifier can be associated with a set of organization or enterprise-specific policies, baselines, profiles, applications, certificates, and other enterprise resources 119 that are part of a user context configuration of the managed VM 122.

Provide a user interface through an organization or enterprise display name can be entered, selected, or otherwise added to the VM .vmx file.

Generate a digital signature based on an admin-provided certificate such as an enterprise certificate or a management service certificate. The digital signature can be based on one or more of: the managed VM configuration file 124 (or a subset of protected configuration settings within the managed VM configuration file 124), the virtual disk .vmdk file or files, and the NVRAM file 126.

Provide a user interface through which a user can enter or select an enrollment grace period or period of time within which the managed VM 122 must enroll, re-enroll, check in, or otherwise contact the management service 120 to maintain enrollment. In some examples, the packaging tool 130 can require the enrollment grace period to be set to a time period of 90 days or less.

Provide a user interface through which a user can specify whether a hardware-based crypto-processor, or a software-based or virtualize crypto-processor is to be used. The packaging tool 130 can include a user interface through which a user can create, install and uninstall command-line arguments and scripts to use for PCLM, MDM, or manual deployment and provisioning.

The packaging tool 130 can generate the managed VM package 210 to include a .ppkg file and an unattend.xml file. The .ppkg file and an unattend.xml file can be copied to the managed VM 122. A provisioning tool 131 can be included with the host management agent 209 or can be provided separately. In some cases, the provisioning tool 131 can automatically select the .ppkg file and an unattend.xml file from the managed VM package 210, or can provide a user interface through which a user can select the .ppkg file and an unattend.xml file, and a user interface element to install the managed VM package 210.

At step 612, an administrator can distribute the managed VM package 210 to the host device 106 using the management service 120, a PCLM, SCCM, AD, UEM, MDM, or other management services, manually, or using a script. The managed VM package 210 can be accessed during deployment through a removable drive connected to the host device 106, a file share accessed by the host device 106, a FTP, or similar systems. The management service 120 or another management service can identify that the host management agent 209 and the host desktop hypervisor 203 are installed and distribute the managed VM package 210 to the host device 106. The managed VM package 210, the host management agent 209, or the host desktop hypervisor 203 can include a provisioning tool 131. The provisioning tool 131 can initiate and implement a provisioning process. The provisioning process can use a managed VM package to install, configure, and launch a managed VM 122.

At step 615, the provisioning tool 131 can provision a managed VM 122 on the host device 106 using the managed VM package 210. The provisioning process is described further with respect to FIG. 6B.

Figure 6B:
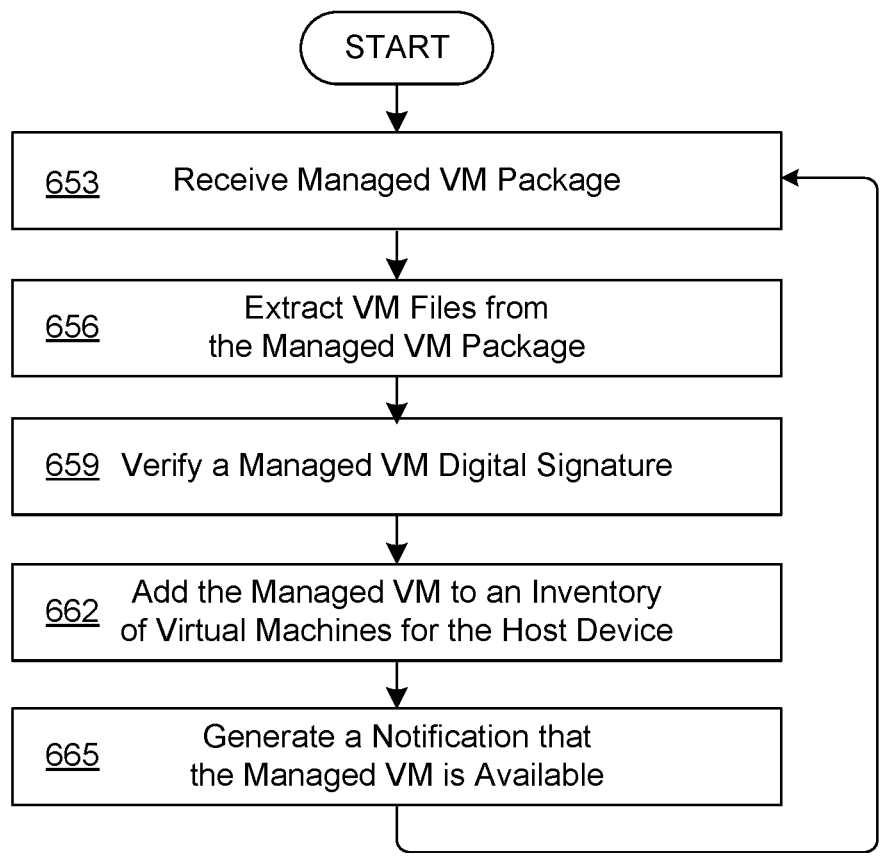
FIG. 6B illustrates another flowchart performed by components of the networked environment, according to various examples described herein.

FIG. 6B shows a flowchart performed by components of the networked environment 100. Generally, the flowchart illustrates how components of the networked environment 100 work in concert to provision a managed VM 122 on a host device 106.

In step 653, a provisioning tool 131 can receive a managed VM package 210. The provisioning tool 131 can receive the managed VM package 210 from the management service 120, a PCLM, SCCM, AD, UEM, MDM, or another management service. The managed VM package 210 can be provided manually or can be delivered using a script. The provisioning tool 131 can generate and implement command line arguments as well as scripts, API calls and operating system calls to extract and provision a managed VM 122 on a host device 106 using the managed VM package 210.

In step 656, the provisioning tool 131 can extract the VM files from the managed VM package 210 to a predetermined folder location. The predetermined folder location can be received as part of the managed VM package 210, received from the management service 120, or can be included within the provisioning tool 131.

In step 659, the provisioning tool 131 can verify a managed VM digital signature included with the managed VM package 210. This can include comparing hashes or another type of digital signature, and verifying a signer certificate is valid, trusted and not revoked. The certificate can be verified based on a certificate authority that can be accessed over the network 111. Alternatively, the provisioning tool 131 can include a certificate that can be used to verify the signer certificate of the managed VM package 210.

The managed VM digital signature from the managed VM package 210 can be compared to a verifying digital signature that can be received from the management service 120 or otherwise delivered to the host device 106. The verifying digital signature can include a hash or another type of digital signature that is based on an intended version of a managed VM configuration file 124 for the managed VM 122 (or a subset of protected configuration settings), the virtual disk .vmdk file or files, and the NVRAM file 126. Other files from the managed VM 122 can be excluded. If the managed VM digital signature is not verified, provisioning tool 131 can auto repair these settings if they are altered, as well as notify the user that something was fixed.

Alternatively, the provisioning tool 131 can transmit a verification request to the management service 120. The request can include the managed VM digital signature extracted from the managed VM package 210. The management service 120 can compare the managed VM digital signature to a verifying digital signature and can also verify the certificate. The management service 120 can return a verification status based on a comparison. The verification status can indicate that the managed VM digital signature is verified or unverified.

Verification of the digital signature can indicate that the parameters of the managed VM package 210 match those of an intended version of the managed virtual machine configuration file. The digital signature can be based on a protected subset of the parameters of the managed VM package 210. In this case, the verification of the digital signature can indicate that the protected parameters of the managed VM package 210 match those of an intended version of the managed virtual machine configuration file.

In step 662, if the managed VM digital signature is verified, the provisioning tool 131 can add the managed VM 122 to an inventory of virtual machines for the host device 106. The host desktop hypervisor 203 can maintain a virtual machine inventory for the host device 106. The provisioning tool 131 can generate and implement command line arguments as well as scripts, API calls, operating system calls, and other function calls that cause the host desktop hypervisor 203 to add the managed VM 122 to the virtual machine inventory.

In step 665, the provisioning tool 131 can generate a notification that the managed VM 122 is available. The notification can indicate that the managed VM 122 is available for use. The provisioning tool 131 can generate and implement command line arguments as well as scripts, API calls, and other function calls to generate the notification that the managed VM 122 is available. The provisioning tool 131 can also cause the host desktop hypervisor 203 to execute the managed VM 122 for the first time. The managed VM 122 can be executed as a guest of the host device 106.

If the auto-add vTPM option is set to software or ON in the managed VM configuration file 124, then the host desktop hypervisor 203 or the host management agent 209 can add a VTPM device to the managed VM 122 using partial encryption and automatic key generation as described. If a user interface locking feature is enabled, the user will not be able to change a predetermined set of VM settings from the user interface of the host desktop hypervisor 203. The managed VM 122 can be accessed in an out of box experience (OOBE) process if the sysprep or other audit mode instructions have been completed. The enrollment grace period timer can start once the managed VM 122 is executed for the first time and the OOBE process has started. A user can complete the OOBE and begin to use the managed VM 122.

Figure 7:
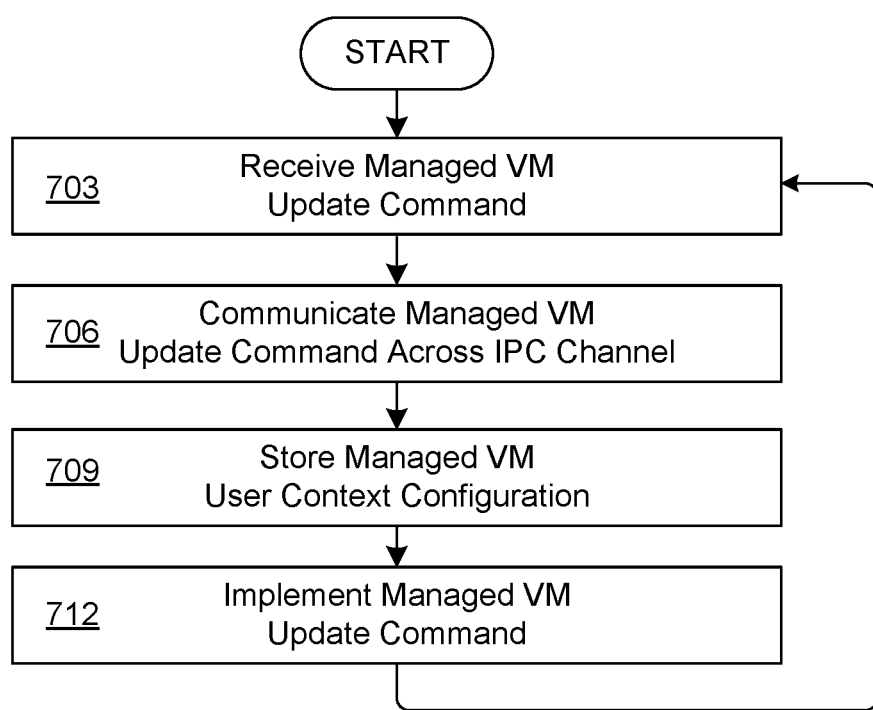
FIG. 7 illustrates another flowchart performed by components of the networked environment, according to various examples described herein.

FIG. 7 shows a flowchart performed by components of the networked environment 100. Generally, the flowchart illustrates how components of the networked environment 100 work in concert to update a managed VM 122 on a host device 106.

In step 703, the guest management agent 209 can receive a managed VM update command 303 from the management service 120. For example, the guest management agent 209 can check in with the management service 120 and retrieve the command from a command queue. Alternatively, the management service 120 can push or otherwise transmit the managed VM update command 303. In some cases, the managed VM update command 303 can include managed VM user context configuration 306 and all data and components required to implement the managed VM update command 303.

In step 706, the guest management agent 209 can transmit or communicate the managed VM update command 303 from the guest management agent 209 through the IPC channel 218 to the host management agent 209. The guest management agent 209 can also transmit the managed VM user context configuration 306 and all data and components required to implement the managed VM update command 303. The managed VM update command 303 can specify that the managed VM 122 should be updated based on the managed VM user context configuration 306.

In step 709, the host management agent 209 can store the managed VM user context configuration 306 and the managed VM update command 303. The managed VM user context configuration 306 and the managed VM update command 303 can be stored in a data location that is outside of the managed VM 122.

In step 712, the host management agent 209 can implement the managed VM update command 303. The host management agent 209 can implement the managed VM user context configuration 306 using the host desktop hypervisor 203. In some cases, the managed VM user context configuration 306 updates can be implemented without restarting the managed VM 122. However, other updates can require the managed VM 122 to be taken offline and then restarted. The host management agent 209 can command the host desktop hypervisor 203 to take the managed VM 122 offline.

While the managed VM 122 is offline, the host management agent 209 can update the managed VM 122 to include profiles, policies, baselines, certificates, and enterprise resources 119, as well as apply operating system updates for the guest operating system 251, and add/remove applications from the applications 253. Once the changes are completed, the host management agent 209 can command the host desktop hypervisor 203 to launch or execute the managed VM 122.

The guest management agent 209 can transmit an indication that the managed VM update command 303 is successfully implemented across the IPC channel 218. Alternatively, the guest management agent 209 can provide the management service 120 an indication that the managed VM update command 303 is successfully implemented, and the management service 120 can forward this information to the host management agent 209. Once the managed VM update command 303 is successfully implemented, the host management agent 209 can delete the managed VM user context configuration 306 and the managed VM update command 303, and other data and components related to the managed VM update command 303.

Figure 8:
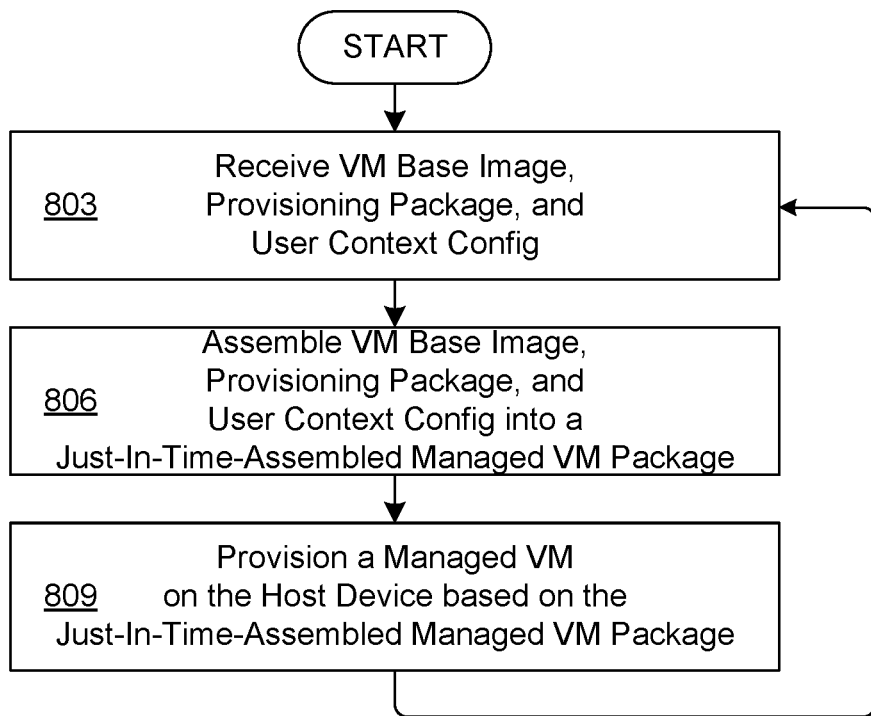
FIG. 8 illustrates another flowchart performed by components of the networked environment, according to various examples described herein.

FIG. 8 illustrates another flowchart performed by components of the networked environment 100. Generally, the flowchart illustrates how components of the networked environment 100 work in concert for just-in-time assembly of a managed VM 122. This can allow for greater deployment flexibility and storage efficiency while requiring fewer complete managed VM packages 210.

In step 803, the host device 106 can receive a VM base image 403, applications 253, and a managed VM user context configuration 306. An administrator can distribute the VM base image 403, the applications 253, and the managed VM user context configuration 306 to the host device 106. This distribution can be achieved using the management service 120, a PCLM, SCCM, AD, UEM, MDM, or other management services, manually, or using a script.

The VM base image 403 can include a selected image that complies with the managed VM rules discussed above. The VM base image 403 can include a guest operating system 251. In some cases, the VM base image 403 can include a minimal subset of the applications 253 that are required for an entire enterprise, or a large group within the enterprise. The VM base image 403 can be applicable to a wide array of different host devices 106 and user accounts with the management service 120.

The applications 253 can include applications 253 including device-specific, user-specific, subgroup-specific, and group-specific applications. The applications 253 can include application volumes and VMDK-based virtual disks which can be added to the managed VM 122, or can be accessed by the managed VM 122 without modifying the managed VM 122 itself. The application volumes and VMDK-based virtual disks can include multiple applications. The application volumes and VMDK-based virtual disks can reside on the host device 106 or a network location accessible by the host device 106 such as a local area network or a wide area network. The applications 253 can be selected based on a device identifier of the host device 106, a user identifier of a user account with the management service 120, a group identifier of a group associated with the user account or host device 106, such as an enterprise identifier, a user group identifier or a user subgroup identifier.

The managed VM user context configuration 306 can include or specify profiles 114, policies 113, baselines, certificates, and enterprise resources 119. The managed VM user context configuration 306 can specify a particular VM base image 403, and applications 253 or set of applications 253. The applications 253 can be part of the managed VM user context configuration 306.

In step 806, the host management agent 209 can assemble the VM base image 403, the applications 253, and the managed VM user context configuration 306 into a just-in-time-assembled managed VM package 210. The host management agent 209 can include just-in-time assembly instructions, or any instructions or application outside the managed VM 122 can perform the assembly process. The host management agent 209 can use remote SSH, remote powershell, and other commands to carry out the assembly of the components into a just-in-time-assembled managed VM package 210.

In step 809, the host management agent 209 can include a provisioning tool 131 that provisions a managed VM 122 using the just-in-time-assembled managed VM package 210. The host management agent 209 can generate and implement command line arguments as well as scripts, API calls and operating system calls. The host management agent 209 can extract the VM files from the managed VM package 210 to a predetermined folder location. The host management agent 209 can also verify a digital signature included with the managed VM package 210, including comparing hashes and verifying a signer certificate is valid, trusted and not revoked. The host management agent 209 can add the managed VM 122 to the host desktop hypervisor 203 inventory of VMs. The host management agent 209 can notify the user that the VM is available to use, through a toast notification or another notification on the host operating system 151 or the guest operating system 251. Once the provisioning process is completed, a user or provisioning tool 131 can cause the host desktop hypervisor 203 to execute the managed VM 122 for the first time.

Figure 9:
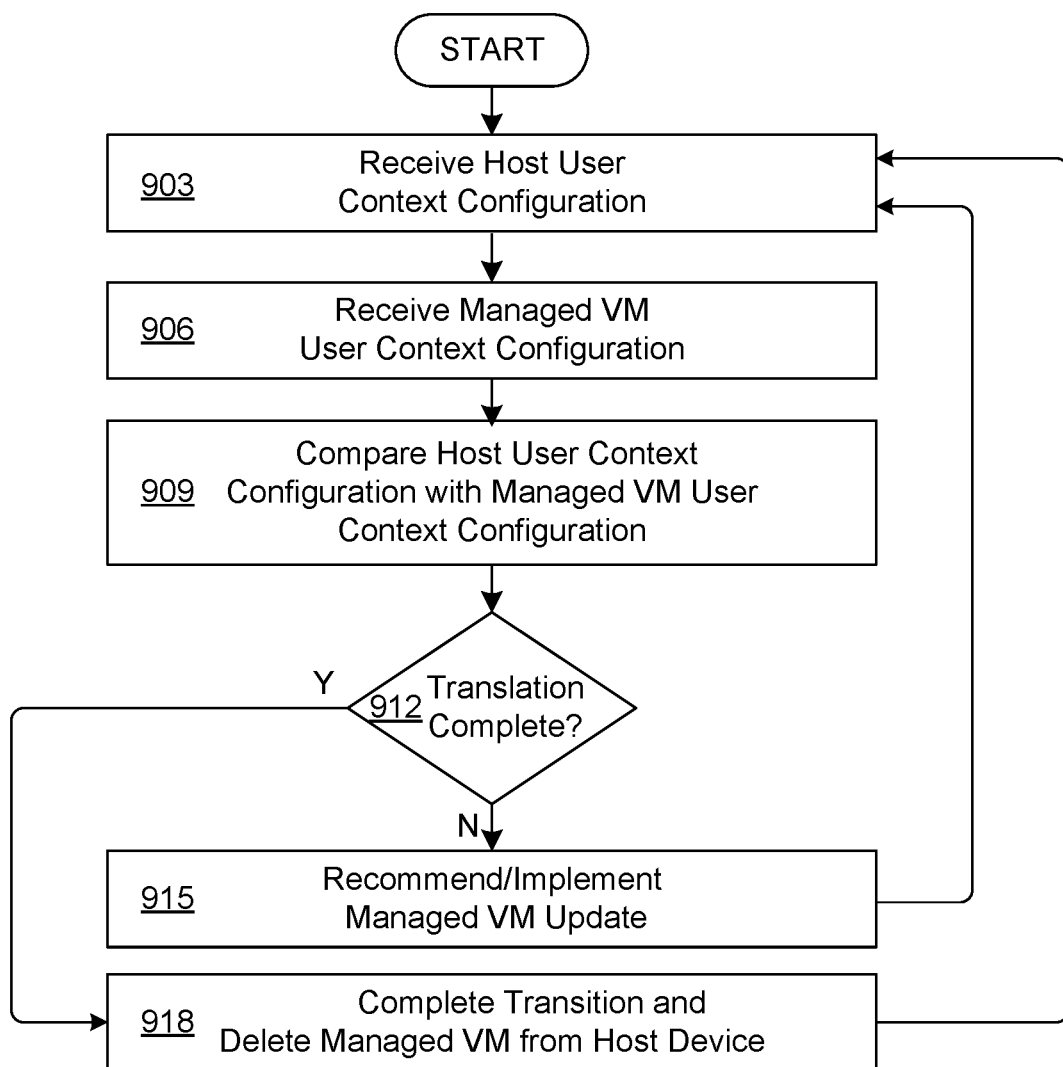
FIG. 9 illustrates another flowchart performed by components of the networked environment, according to various examples described herein.

FIG. 9 illustrates another flowchart performed by components of the networked environment 100. The flowchart illustrates how components of the networked environment 100 work in concert for management of both a managed host device 106 and a managed VM 122, according to various examples described herein. The host device 106 can be managed by a configuration service 512, while the managed VM 122 can be managed by the management service 120. Generally, a comparison service 108 can compare the managed host user context configuration 556 to the managed VM user context configuration 306. Once the two user context configurations sufficiently match, the configuration service 512 can be phased out of use, and the management service 120 can be used for the host device 106.

In step 903, the comparison service 108 can receive a managed host user context configuration 556. For example, the comparison service 108 can transmit a host state request to the host management agent 209 that specifies a set of parameters comprising the managed host user context configuration 556. The host management agent 209 can query for these parameters and return them to the comparison service 108. Alternatively, the host management agent 209 can be preconfigured to query for and provide the managed host user context configuration 556 to the comparison service 108.

In step 906, the comparison service 108 can receive a managed host user context configuration 556. For example, the comparison service 108 can transmit a guest state request to the guest management agent 209 that specifies a set of parameters comprising the managed VM user context configuration 306. The host management agent 209 can query for these parameters and return them to the comparison service 108. Alternatively, the guest management agent 209 can be preconfigured to query for and provide the managed VM user context configuration 306 to the comparison service 108. The host management agent 209 can identify a set of policies 113 enforced by the legacy management service on the host device 106. In some cases, management instructions or a legacy management agent can be executed on the host device 106. The host management agent 209 can query the legacy management agent, the host operating system 151, search a data store of the host device 106, and otherwise query the host device 106 to identify policies 113, profiles 114, host device state data 215, and other aspects of the managed host user context configuration 556.

In step 909, the comparison service 108 can compare the managed host user context configuration 556 and the managed VM user context configuration 306. The comparisons can be done for a single host device 106 or any subset of host devices 106 to be transitioned to modern management. The comparisons can be performed based on the combinations of policies 113 and profiles 114 applied. The comparison service 108 can be provided along with or separately from the management service 120 to provide customers migration of legacy Active Directory and other group policies 113 to modern MDM profiles 114. The comparison service 108 can include a complex translation matrix that describes how to map each specific policy 113 to a modernized profile 114.

In step 912, the comparison service 108 can determine whether translation of the managed host user context configuration 556 to the managed VM user context configuration 306 is complete. If the comparison of the managed host user context configuration 556 and the managed VM user context configuration 306 indicates a complete translation, then the process can move to step 924, otherwise, the process can move to step 915.

The comparison service 108 can identify a complete translation based on a translation score indicating that all, or a threshold number or threshold percentage of, policies 113 from the managed host user context configuration 556 have successfully been translated to profiles 114 of the managed VM user context configuration 306. The translation score can also indicate that all, or a threshold number or threshold percentage of, host-based applications have been included in the applications 253.

The comparison service 108 can identify, automatically or in response to user input, whether certain policies 113 and host-based applications are irrelevant or outdated, so that the overall match can be based on relevant policies 113 only. The comparison service 108 can also identify, automatically or in response to user input, whether certain policies 113 should be implemented as an exception on the managed VM 122. Policies that are implemented as an exception can be included or excluded from the translation score. The managed host user context configuration 556 can include both policies 113 and profiles 114. The profiles 114 can be transferred to the managed VM user context configuration 306 without translation.

In step 915, the comparison service 108 can recommend a managed VM update for the managed VM user context configuration 306. For example, since there is no overall match, there can be a number of untranslated policies 113. The comparison service 108 can provide an administrator with a managed VM update that specifies a set of recommendations or recommended translations from policies 113 to profiles 114. The administrator can accept one or more of the recommended translations through a management console of the management service 120. Some recommendations can be implemented automatically, without administrator or other user interaction. The comparison service 108 can also provide a recommendation for whether a policy 113 can be ignored, de-prioritized, or be removed (i.e., remain untranslated and unmigrated) based on the usage rate of the affected application or operating system feature.

The comparison service 108 can cause the management service 120 to transmit a managed VM update command 303. The comparison service 108 can transmit a request to implement the managed VM update to the management service 120. In other cases, the comparison service 108 can be part of the management service 120. Otherwise, the comparison service 108 can provide a recommendation through a reporting service 109. The managed VM update command 303 can be implemented as indicated in the flowchart of FIG. 7. In some cases, the managed VM user context configuration 306 for the managed VM update command 303 remains pending or preliminary until a user of the specific host device 106, and/or a predetermined threshold number or percentage of users of a set of host devices 106, indicate that the updated managed VM user context configuration 306 is working properly. Where the update command 303 includes translation from a policy 113 to a profile 114, user acceptance can indicate that the translation is successful.

There are multiple different ways to transition from the configuration service 512 to the management service 120. The initial version of the managed VM 122 can include the guest operating system 251 and may provide no access or limited access to enterprise resources 119. In this situation, the comparison service 108 can recommend or automatically implement a threshold number of additional applications 253 to the managed VM 122, for example, one at a time, two at a time, and so on. The comparison service 108 can identify additional applications 253 that exist on the host device 106 outside or separately from the managed VM 122, but are not currently on the managed VM 122. In some cases, the update can add an additional or replacement icon in the host operating system 151 that provides access to an additional provisioned application 253 using the managed VM 122, rather than the host-based copy. In other cases, the initial version of the managed VM 122 can start off with a set of applications 253 that match host-based applications on the host device 106.

Once the user, or a threshold number or percentage of users, indicate that the additional provisioned application 253 is operating correctly and has access to enterprise data and enterprise resources 119, then the change can be finalized, and the matching host-based application can be removed from the host device 106 file system. The comparison service 108 can use the management service 120 to transmit a removal command transmitted to the guest management agent 212, which can be relayed to and be implemented by the host management agent 209. The comparison service 108 can alternatively use the configuration service 512 to transmit a removal command implemented using a host-based management component of the configuration service 512.

Policies 113 can also be incrementally translated to profiles 114 on the managed VM 122 in response to an update and user approval. Policies 113 that are associated with the additional provisional application 253 can be prioritized and included in an update that provides access to the additional provisional application 253. The comparison service 108 can identify the association using a translation matrix of the comparison service 108 or the management service 120. For policies 113 and profiles 114, the initial version of the managed VM 122 can initially include no policies 113 and profiles 114, or a set of policies 113 and profiles 114 that match those of the host device 106.

In step 918, where an overall configuration match has been identified, the comparison service 108 can recommend or implement a command to complete a transition from the configuration service 512 to the management service 120. For example, the comparison service 108 can transmit, to the management service 120, a request to complete a transition from the configuration service 512 to the management service 120. In other cases, the comparison service 108 can be part of the management service 120. Otherwise, the comparison service 108 can provide a recommendation through a reporting service 109.

There are several options on how to phase out legacy management and complete a transition from the configuration service 512 to the management service 120. For example, the managed VM 122 can be converted into a physical disk image to be used to re-image the host device 106. Thereafter, the managed VM 122 can be removed or deleted. The re-imaged host device 106 can then be managed by the management service 120 only. Further examples are provided with respect to FIG. 5.

In some cases, the completion of the transition from the configuration service 512 to the management service 120 is predicated on both administrator and user approval. The comparison service 108, in conjunction with the management service 120, can identify that an administrator has selected a user interface element that approves the transition from the configuration service 512 to the management service 120. The comparison service 108, in conjunction with the management service 120, can also transmit a request for user confirmation to the host device. The host management agent 209 and/or the guest management agent 209 to notify the user to approve the transition from the configuration service 512 to the management service 120. The host management agent 209 and/or the guest management agent 209 can generate a user interface that includes a user interface element that accepts a user approval of the transition from the configuration service 512 to the management service 120 from a user of the host device 106.

The flowchart(s) and sequence diagram(s) show examples of the functions and operation of the components described herein. The components described herein can be embodied in hardware, software, or a combination of hardware and software. If embodied in software, each element can represent a module or group of code that includes program instructions to implement the specified logical function(s). The program instructions can be embodied in the form of, for example, source code that includes human-readable statements written in a programming language or machine code that includes machine instructions recognizable by a suitable execution system, such as a processor in a computer system or other system. If embodied in hardware, each element can represent a circuit or several interconnected circuits that implement the specified logical function(s).

The computing environment 103 can include at least one processing circuit. Such a processing circuit can include, for example, one or more processors and one or more storage or memory devices that are coupled to a local interface. The local interface can include, for example, a data bus with an accompanying address/control bus or any other suitable bus structure. Similarly, the host devices 106 can each include at least one processing circuit. Such a processing circuit can include, for example, one or more processors and one or more storage or memory devices that are coupled to a local interface.

The storage or memory devices can store data or components that are executable by the processors of the processing circuit. For example, the management service 120 and/or other components can be stored in one or more storage devices and be executable by one or more processors in the networked environment 100. Similarly, the agents, services, applications and/or other components described herein can be stored in one or more storage devices and be executable by one or more processors in the host device 106.

The management service 120 and/or other components described herein can be embodied in the form of hardware, software components that are executable by hardware, or as a combination of software and hardware. If embodied as hardware, the components described herein can be implemented as a circuit or state machine that employs any suitable hardware technology. The hardware technology can include, for example, one or more microprocessors, discrete logic circuits having logic gates for implementing various logic functions upon an application of one or more data signals, application specific integrated circuits (ASICs) having appropriate logic gates, programmable logic devices (e.g., field-programmable gate array (FPGAs), and complex programmable logic devices (CPLDs)).

Also, one or more of the components described herein that include software or program instructions can be embodied in any non-transitory computer-readable medium for use by or in connection with an instruction execution system such as, a processor in a computer system or other system. The computer-readable medium can contain, store, and/or maintain the software or program instructions for use by or in connection with the instruction execution system.

A computer-readable medium can include a physical media, such as, magnetic, optical, semiconductor, and/or other suitable media. Examples of a suitable computer-readable media include, but are not limited to, solid-state drives, magnetic drives, or flash memory. Further, any logic or component described herein can be implemented and structured in a variety of ways. For example, one or more components described can be implemented as modules or components of a single application. Further, one or more components described herein can be executed in one computing device or by using multiple computing devices.

Further, any logic or applications described herein, including the management service 120 and/or other components can be implemented and structured in a variety of ways. For example, one or more applications described can be implemented as modules or components of a single application. Further, one or more applications described herein can be executed in shared or separate computing devices or a combination thereof. For example, a plurality of the applications described herein can execute in the same computing device, or in multiple computing devices. Additionally, terms such as "application," "service," "system," "engine," "module," and so on can be used interchangeably and are not intended to be limiting.

The above-described examples of the present disclosure are merely possible examples of implementations set forth for a clear understanding of the principles of the disclosure. Many variations and modifications can be made without departing substantially from the spirit and principles of the disclosure. All such modifications and variations are intended to be included herein within the scope of this disclosure and protected by the following claims.

Therefore, the following is claimed:

1. A method implemented by instructions executed by at least one computing device, the method comprising:
   receiving, from a host management agent executed by a host device separately from a managed virtual machine executed by the host device, a host user context configuration comprising at least one policy of a first management service;
   receiving, from a guest management agent in the managed virtual machine, a guest user context configuration comprising at least one profile, wherein the guest management agent is associated with a second management service;
   inputting at least a portion of the host user context configuration into a translation matrix to identify a configuration service provider (CSP)-based profile that is mapped to a policy of the at least one policy; and
   transmitting, to the guest management agent, a command to enforce the CSP-based profile on the managed virtual machine.

2. The method according to claim 1, wherein the host user context configuration comprises at least one application executed separately from the managed virtual machine on the host device.

3. The method according to claim 1, further comprising:
   transmitting, to the guest management agent, a command to provision an application of at least one application to the managed virtual machine.

4. The method according to claim 1, further comprising:
   receiving, from the host device, a user approval of an application that is provisioned to the managed virtual machine; and
   transmitting, to the host device, a command to delete a host-based copy of the application from a file system of the host device.

5. The method according to claim 1, further comprising:
   identifying that a threshold percentage of the at least one policy of the host user context configuration are implemented as CSP-based profiles of the guest user context configuration; and
   identifying that a threshold percentage of host-based applications are included in the managed virtual machine.

6. The method according to claim 1, further comprising:
   determining that a transition from the first management service to the second management service is completed; and
   reimaging the host device based on the managed virtual machine.

7. The method according to claim 1, further comprising:
   determining that a transition from the first management service to the second management service is completed; and
   imaging another host device based on the managed virtual machine.

8. A non-transitory computer-readable medium embodying instructions executable by at least one computing device wherein the instructions, when executed, cause the at least one computing device to at least:
   receive, from a host management agent executed by a host device separately from a managed virtual machine executed by the host device, a host user context configuration comprising at least one policy of a first management service;
   receive, from a guest management agent in the managed virtual machine, a guest user context configuration comprising at least one profile, wherein the guest management agent is associated with a second management service;
   input at least a portion of the host user context configuration into a translation matrix to identify a configuration service provider (CSP)-based profile that is mapped to a policy of the at least one policy; and
   transmit, to the guest management agent, a command to enforce the CSP-based profile on the managed virtual machine.

9. The non-transitory computer-readable medium according to claim 8, wherein the host user context configuration comprises at least one application executed separately from the managed virtual machine on the host device.

10. The non-transitory computer-readable medium according to claim 8, wherein the instructions, when executed, cause the at least one computing device to at least:
transmit, to the guest management agent, a command to provision an application of at least one application to the managed virtual machine.

11. The non-transitory computer-readable medium according to claim 8, wherein the instructions, when executed, cause the at least one computing device to at least:
receive, from the host device, a user approval of an application that is provisioned to the managed virtual machine; and
transmit, to the host device, a command to delete a host-based copy of the application from a file system of the host device.

12. The non-transitory computer-readable medium according to claim 8, wherein the instructions, when executed, cause the at least one computing device to at least:
identify that a threshold percentage of the at least one policy of the host user context configuration are implemented as CSP-based profiles of the guest user context configuration; and
identify that a threshold percentage of host-based applications are included in the managed virtual machine.

13. The non-transitory computer-readable medium according to claim 8, wherein the instructions, when executed, cause the at least one computing device to at least:
determine that a transition from the first management service to the second management service is completed; and
reimage the host device based on the managed virtual machine.

14. The non-transitory computer-readable medium according to claim 8, wherein the instructions, when executed, cause the at least one computing device to at least:
determine that a transition from the first management service to the second management service is completed; and
image another host device based on the managed virtual machine.

15. A system, comprising:
at least one computing device comprising a processor; and
instructions stored in a non-transitory computer-readable medium and accessible by the at least one computing device, wherein the instructions, when executed by the processor, cause the at least one computing device to at least:
receive, from a host management agent executed by a host device separately from a managed virtual machine executed by the host device, a host user context configuration comprising at least one policy of a first management service;
receive, from a guest management agent in the managed virtual machine, a guest user context configuration comprising at least one profile, wherein the guest management agent is associated with a second management service;
input at least a portion of the host user context configuration into a translation matrix to identify a configuration service provider (CSP)-based profile that is mapped to a policy of the at least one policy; and
transmit, to the guest management agent, a command to enforce the CSP-based profile on the managed virtual machine.

16. The system according to claim 15, wherein the host user context configuration comprises at least one application executed separately from the managed virtual machine on the host device.

17. The system according to claim 15, wherein the instructions, when executed by the processor, cause the at least one computing device to at least:
transmit, to the guest management agent, a command to provision an application of at least one application to the managed virtual machine.

18. The system according to claim 15, wherein the instructions, when executed by the processor, cause the at least one computing device to at least:
receive, from the host device, a user approval of an application that is provisioned to the managed virtual machine; and
transmit, to the host device, a command to delete a host-based copy of the application from a file system of the host device.

19. The system according to claim 15, wherein the instructions, when executed by the processor, cause the at least one computing device to at least:
identify that a threshold percentage of the at least one policy of the host user context configuration are implemented as CSP-based profiles of the guest user context configuration; and
identify that a threshold percentage of host-based applications are included in the managed virtual machine.

20. The system according to claim 15, wherein the policy is a group-based policy.

* * * * *